(12) United States Patent
Benosman et al.

(10) Patent No.: US 10,109,057 B2
(45) Date of Patent: Oct. 23, 2018

(54) METHOD OF TRACKING SHAPE IN A SCENE OBSERVED BY AN ASYNCHRONOUS LIGHT SENSOR

(71) Applicants: CENTRE NATIONAL DE LA RECHERCHE SCIENTIFIQUE—CNRS, Paris (FR); UNIVERSITE PIERRE ET MARIE CURIE (PARIS 6), Paris (FR)

(72) Inventors: Ryad Benosman, Pantin (FR); Siohoi Ieng, Montreuil (FR); Stephane Regnier, Bois-Colombes (FR); Ni Zhenjiang, Maisons-Alfort (FR)

(73) Assignees: CENTRE NATIONAL DE LA RECHERCHE SCIENTIFIQUE—CNRS, Paris (FR); UNIVERSITE PIERRE ET MARIE CURIE (PARIS 6), Paris (FR)

( * ) Notice: Subject to any disclaimer, the term of this patent is extended or adjusted under 35 U.S.C. 154(b) by 167 days.

(21) Appl. No.: 15/307,490

(22) PCT Filed: Apr. 24, 2015

(86) PCT No.: PCT/FR2015/051129
§ 371 (c)(1),
(2) Date: Oct. 28, 2016

(87) PCT Pub. No.: WO2015/166176
PCT Pub. Date: Nov. 5, 2015

(65) Prior Publication Data
US 2017/0053407 A1    Feb. 23, 2017

(30) Foreign Application Priority Data

Apr. 30, 2014  (FR) ..................... 14 54003

(51) Int. Cl.
*G06T 7/00*        (2017.01)
*G06T 1/00*        (2006.01)
(Continued)

(52) U.S. Cl.
CPC ............ *G06T 7/0042* (2013.01); *G06T 7/246* (2017.01); *G06T 7/73* (2017.01); *G06T 1/0007* (2013.01); *G06T 2207/10141* (2013.01)

(58) Field of Classification Search
CPC . G06T 2207/30196; G06T 2207/10016; G06T 2207/30232; G06T 2207/30224;
(Continued)

(56) References Cited

U.S. PATENT DOCUMENTS 7,750,841 B2 *  7/2010  Oswald .................... G01S 5/04
                                                    342/126
8,320,618 B2 * 11/2012  Ikenoue .................. G06T 7/277
                                                    348/169
(Continued)

FOREIGN PATENT DOCUMENTS

WO       2013/093378 A1    6/2013

OTHER PUBLICATIONS

"Asynchronous Event-Based Multikernel Algorithm for High-Speed Visual Features Tracking"; Lagorce, Xavier; Meyer, Cedric; Ieng, Sio-Hoi; Filliat, David; Benosman, Ryad; IEEE Transactions on Neural Networks & Learning Systems. Aug. 2015, vol. 26 Issue 8, p. 1710-1720.*
(Continued)

*Primary Examiner* — Michael Osinski
(74) *Attorney, Agent, or Firm* — Young & Thompson

(57) ABSTRACT

Asynchronous information is provided by a sensor having a matrix of pixels disposed opposite the scene. The asynchronous information includes, for each pixel of the matrix, successive events originating from this pixel, that may
(Continued)

depend on variations of light in the scene. A model representing the tracked shape of an object is updated after detecting events attributed to this object in the asynchronous information. Following detection, the updating of the model includes an association of a point of the model with the event detected by minimizing a criterion of distance with respect to the pixel of the matrix from which the detected event originates. The updated model is then determined as a function of the pixel of the matrix from which the detected event originates and attributed to the object and of the associated point in the model, independently of the associations performed before the detection of this event.

18 Claims, 27 Drawing Sheets

(51) Int. Cl.
*G06T 7/246* (2017.01)
*G06T 7/73* (2017.01)

(58) Field of Classification Search
CPC ....... G06T 7/20; G06T 7/0042; G06T 7/2033; G06T 7/73; G06T 7/292; G06T 7/246; G06T 7/269; G06T 7/80; H04N 5/23229; G06K 2009/3291
See application file for complete search history.

(56) References Cited

U.S. PATENT DOCUMENTS

| | | | | |
|---|---|---|---|---|
| 8,335,345 | B2* | 12/2012 | White | A63B 24/0003 348/135 |
| 9,213,902 | B2* | 12/2015 | Benosman | G06T 7/269 |
| 9,886,768 | B2* | 2/2018 | Regnier | G06T 7/20 |
| 9,934,557 | B2* | 4/2018 | Ji | G06T 7/80 |
| 9,952,323 | B2* | 4/2018 | Deane | G01S 17/89 |
| 2007/0086621 | A1* | 4/2007 | Aggarwal | G06K 9/00369 382/103 |
| 2007/0248244 | A1* | 10/2007 | Sato | G06F 17/30265 382/103 |
| 2008/0135731 | A1 | 6/2008 | Lichtsteiner et al. | |
| 2008/0204322 | A1* | 8/2008 | Oswald | G01S 5/04 342/465 |
| 2008/0219509 | A1* | 9/2008 | White | A63B 24/0003 382/107 |
| 2009/0296989 | A1* | 12/2009 | Ramesh | G06K 9/00771 382/103 |
| 2010/0296697 | A1* | 11/2010 | Ikenoue | H04N 7/18 382/103 |
| 2010/0322516 | A1* | 12/2010 | Xu | G06K 9/00778 382/173 |
| 2011/0052002 | A1* | 3/2011 | Cobb | G06K 9/00771 382/103 |
| 2012/0112038 | A1* | 5/2012 | Hamoir | H04N 5/2256 250/208.1 |
| 2013/0113934 | A1* | 5/2013 | Hotta | G06K 9/00778 348/143 |
| 2013/0335595 | A1* | 12/2013 | Lee | H04N 5/23229 348/231.5 |
| 2014/0286537 | A1* | 9/2014 | Seki | G06T 7/73 382/107 |
| 2014/0363049 | A1* | 12/2014 | Benosman | G06K 9/00771 382/103 |
| 2015/0285625 | A1* | 10/2015 | Deane | G01S 17/10 348/140 |
| 2016/0078321 | A1* | 3/2016 | Wang | G06K 9/6267 382/103 |
| 2016/0086344 | A1* | 3/2016 | Regnier | G06K 9/6218 382/103 |
| 2016/0203614 | A1* | 7/2016 | Wang | G06K 9/00335 382/103 |
| 2018/0017853 | A1* | 1/2018 | Smits | G03B 21/147 |
| 2018/0122085 | A1* | 5/2018 | Regnier | G06T 7/277 |

OTHER PUBLICATIONS

"Visual Tracking Using Neuromorphic Asynchronous Event-Based Cameras"; Ni, Zhenjiang; Ieng, Sio-Hoi; Posch, Christoph; Régnier, Stéphane; Benosman, Ryad; Neural Computation. 2015, vol. 27 Issue 4, p. 925-953.*
Delbruck et al.: "Fast sensory motor control based on event-based hybrid neuromorphic-procedural system", ISCAS 2007, May 27, 2007 (May 27, 2007), pp. 845-848, XP031181393, DOI: doi:10.1109/ISCAS.2007.378038.
Benosman R. et al.: "Event-Based Visual Flow", IEEE Transactions on Neural Networks and Learning Systems, IEEE, Piscataway, NJ, USA, vol. 25, No. 2, Feb. 2014 (Feb. 1, 2014), pp. 407-417, XP011536914, ISSN: 2162-237X, [retrieved on Jan. 10, 2014], DOI: 10.1109/TNNLS.2013.2273537.
Paul B. et al.: "A Method for Registration of 3-D Shapes", IEEE Transactions on Pattern Analysis and Machine Intelligence, IEEE Computer Society, USA, vol. 14, No. 2, Feb. 1992 (Feb. 1, 1992), pp. 239-256, XP000248481, ISSN: 0162-8828, DOI: 10.1109/34.121791.
Posch et al.: "A QVGA 143 dB Dynamic Range Frame-Free PWM Image Sensor With Lossless Pixel-Level Video Compression and Time-Domain CDS", IEEE Journal of Solid-State Circuits, vol. 46, No. 1, Jan. 2011 (Jan. 1, 2011), pp. 259-275, XP055185382, DOI: doi:10.1109/JSSC.2010.2085952.
Micha H. et al.: "Iterative Estimation of Rigid Body Transformations— Application to robust object tracking and Iterative Closest Point", Journal of Mathematical Imaging and Vision, vol. 43, No. 1, 2012, pp. 1-9, XP035038476, DOI: doi:10.1007/s10851-011-0279-x.
Lichtsteiner et al.: "A 128×128 120 dB 15 us Latency Asynchronous Temporal Contrast Vision Sensor", IEEE Journal of Solid-State Circuits, vol. 43, No. 2, Feb. 2008 (Feb. 1, 2008), pp. 566-576, XP011200748, DOI: doi:10.1109/JSSC.2007.914337.
Rusinkiewicz et al.: "Efficient Variants of the ICP Algorithm", 3rd International Conference on 3D Digital Imaging and Modeling, Jun. 2001 (Jun. 1, 2001), pp. 145-152, XP010542858.
Delbruck et al.: "Activity-Driven, Event-Based Vision Sensors", Proceedings of 2010 IEEE International Symposium on Circuits and Systems (ISCAS, pp. 2426-2429, XP031724396.
Zhenjiang Ni et al.: "Asynchronous Event-Based Visual Shape Tracking for Stable Haptic Feedback in Microrobotics", IEEE Transactions on Robotics, IEEE Service Center, Piscataway, NJ, US, vol. 28, No. 5, Oct. 2012 (Oct. 1, 2012), pp. 1081-1089, XP011474264, ISSN: 1552-3098, DOI: 10.1109/TRO.2012.2198930.
Delbruck et al. "Frame-free dynamic digital vision", Proceedings of Intl. Symp. on Secure-Life Electronics, Advanced Electronics for Quality Life and Society, Univ. of Tokyo, Mar. 6-7, 2008, pp. 21-26.
International Search Report, dated Jul. 6, 2015, from corresponding PCT application.

* cited by examiner

METHOD OF TRACKING SHAPE IN A SCENE OBSERVED BY AN ASYNCHRONOUS LIGHT SENSOR

FIELD OF THE INVENTION

The present invention relates to methods for detecting and for tracking objects in motion in scenes observed by optical sensors.

BACKGROUND OF THE INVENTION

Among the known techniques for detecting objects in images, there are iterative algorithms for searching for the closest points, i.e. of the ICP (Iterative Closest Point) type. These ICP algorithms are known for their effectiveness in applications such as range data registration, 3D reconstruction, object tracking and motion analysis. See for example the article "Efficient Variants of the ICP Algorithm", by S. Rusinkiewicz and M. Levoy, $3^{rd}$ International Conference on 3D Digital Imaging and Modeling, June 2001, pp. 145-152.

The principle of an ICP algorithm is to use a set of points used as a model delimiting the contour of the object in order to have it correspond with a set of points that is part of the acquired data. A transformation between the known model set and the set of points of the data is estimated in order to express their geometrical relationships by minimizing an error function. The tracking of an arbitrary shape can be resolved by ICP technique when a model of this shape is provided.

The article "Iterative Estimation of Rigid Body Transformations Application to robust object tracking and Iterative Closest Point", by M. Hersch, et al., Journal of Mathematical Imaging and Vision, 2012, Vol. 43, No. 1, pp 1-9, presents an iterative method for executing the ICP algorithm. In order to determine a rigid spatial transformation T that makes it possible to detect in an image a pattern defined by a set of points $\{x_i\}$ to which points of the image respectively correspond, the classic analytic, closed form solution, consisting in seeking the transformation T by minimizing an error criterion of the shape $$\sum_i \|y_i - Tx_i\|^2$$

where the sum concerns the set of points $x_i$ of the pattern, is replaced with an iterative solution wherein an initial estimation of the transformation T is taken, and each iteration consists in randomly taking a point $x_i$ from the pattern, in finding its corresponding point $y_i$, in the image and in updating the transformation T by subtracting a term that is proportional to the gradient $\nabla\|y_i-Tx_i\|^2$ relatively to the parameters of translation and of rotation of the transformation T. When the transformation T becomes stationary from one iteration to the other, the iterations stop and T is retained as the final estimation of the transformation that makes it possible to detect the pattern in the image.

In the conventional vision based on successively acquired images, the rate of images of the camera (of about 60 images per second, for example) is often insufficient for ICP techniques. The repetitive calculation of the same information in successive images also limits the performance in real time of the ICP algorithms. In practice, they are restricted to cases for detecting simple shapes that do not move too quickly.

Contrary to conventional cameras that record successive images at regular sampling instants, biological retinas transmit only very little redundant information on the scene to be visualized, and this asynchronously. Asynchronous event-based vision sensors deliver compressed digital data in the form of events. A presentation of such sensors can be consulted in "Activity-Driven, Event-Based Vision Sensors", T. Delbrück, et al., Proceedings of 2010 IEEE International Symposium on Circuits and Systems (ISCAS), pp. 2426-2429. Event-based vision sensors have the advantage of removing the redundancy, reducing latency time and increasing the dynamic range with respect to conventional cameras.

The output of such a vision sensor can consist, for each pixel address, in a sequence of asynchronous events that represent changes in the reflectance of the scene at the time they occur. Each pixel of the sensor is independent and detects changes in intensity greater than a threshold since the emission of the last event (for example a contrast of 15% on the logarithm for the intensity). When the change in intensity exceeds the threshold set, an ON or OFF event is generated by the pixel according to whether the intensity increases or decreases. Certain asynchronous sensors associate the detected events with measurements of light intensity. As the sensor is not sampled on a clock as a conventional camera, it can take the sequencing of events into account with very great time precision (for example of about 1 µs). If such a sensor is used to reconstruct a sequence of images, an image frame rate of several kilohertz can be achieved, compared to a few tens of hertz for conventional cameras.

Event-based vision sensors have promising perspectives, and it is desirable to propose effective methods for tracking objects in motion using signals delivered by such sensors.

In "Fast sensory motor control based on event-based hybrid neuromorphic-procedural system", ISCAS 2007, New Orleans, 27-30 May 2007 pp. 845-848, T. Delbrück and P. Lichsteiner describe an algorithm for tracking clusters (cluster tracker) that can be used for example for controlling a soccer goalkeeper robot using an event-based vision sensor. Each cluster models a mobile object as a source of event. Events that fall in the cluster change the position of the latter. A cluster is considered as visible only if it has received a number of events greater than a threshold.

In "Asynchronous event-based visual shape tracking for stable haptic feedback in microrobotics", Z. Ni, et al., IEEE Transactions on Robotics, 2012, Vol. 28, No. 5, pp. 1081-1089, an event-based version of the ICP algorithm is presented, which is based on minimizing a cost function in analytical form.

There is a need for a method for tracking shapes that is rapid and that has good temporal precision.

SUMMARY OF THE INVENTION

A method of tracking a shape in a scene is proposed, comprising:
  receiving asynchronous information from a light sensor having a matrix of pixels arranged opposite the scene, wherein the asynchronous information comprises, for each pixel of the matrix, successive events originating asynchronously from said pixel; and
  updating a model comprising a set of points and representing a tracked shape of an object, after detecting events attributed to said object in the asynchronous information.
The updating comprises, following detection of an event:

associating with the detected event a point of the model having a minimum distance with respect to the pixel of the matrix from which the detected event originates; and determining the updated model according to the pixel of the matrix from which the detected event originates and the associated point, and independently of the associations performed before the detection of said event.

Matching of the points observed with the model is not carried out in a grouped way after the acquisition of a complete image or even a sufficient number of events with respect to the tracked shape in the scene. The tracking of shapes via the iterative algorithm is carried out much more quickly, as the asynchronous events arrive.

Determining the spatial transformation allowing the model to be updated is usually based on minimizing a cost function of the form:

$$\Sigma D(p[ev], F_t(A[ev])) \quad (1)$$

where: p[ev] designates the position in the matrix of the pixel from which an event ev originated;
A[ev] designates the point of the model associated with the event ev;
$F_t(.)$ designates the spatial transformation;
D(.,.) is a measurement of distance in the plane of the matrix;
and the sum runs on a certain number of associations (p[ev]↔A[ev]) that were carried out.

In the method proposed, the approach is different because the association between the current event and the point of the model that has been associated with it is taken into account, but not prior associations. As the cost function cannot be minimized based on this alone, each iteration makes it possible to calculate a corrective term, not unlike in a gradient descent, which is applied to the model in order to converge the latter to the solution that correctly tracks the shape in the scene. Such convergence is ensured even when the object is in motion, thanks to the dynamics and to the high number of events that the motion causes.

In order to filter the acquisition noise, one can refrain from updating the model when no point of the model is located at a distance less than a threshold with respect to the pixel from which originates a detected event, which in this case is not attributed to the object.

An interesting embodiment of the method further comprises:
estimating a plane of displacement of the object, wherein the plane of displacement is estimated in a space with three dimensions, namely two spatial dimensions corresponding to two directions of the matrix of pixels and one time dimension, by minimizing a distance criterion in relation to a set of points that mark detected events which were attributed to the object during a time window ending at a current instant; and
following detection of an event, taking into account the estimated plane of displacement of the object in order to decide whether or not to attribute said event to the object.

The properties of the aforesaid "plane of displacement" allow for several useful pieces of processing, in particular in the case where a plurality of objects have respective shapes tracked in the scene, each one of the objects having a respective model updated after detection of events that are attributed thereto and an estimated plane of displacement.

For instance, following detection of an event attributable to at least two of the objects, it is possible to calculate respective distances, in the three-dimensional space, between a point that marks the detected event and the planes of displacement respectively estimated for said objects, and attribute the detected event to the object for which the calculated distance is minimal. This makes it possible to combines spatial and time constraints in order to remove ambiguities between several objects to which a detected event is attributable.

Another possibility is to estimate a statistical distribution of distances between the plane of displacement of the object and of points marking detected events which were attributed to the object and then, after detection of an event, take into account the estimated plane of displacement of the object and of the estimated statistical distribution in order to decide whether or not to attribute the event to an object. This makes it possible to take into account the possible motion of the background of the scene when the asynchronous sensor is itself in motion. In particular, it is possible to determine an interval of admissible distance values based on the estimated statistical distribution, and to not attribute a detected event to the object if the point marking this detected event in the three-dimensional space has, with respect to the estimated plane of displacement, a distance that falls outside of the interval of the admissible distance values.

Other features can be provided when a plurality of objects have respective shapes tracked in the scene, each one of the objects having a respective model updated after detection of events attributed thereto.

For instance, if following detection of an event, only one of the objects satisfies a condition of having in its model a point that has a distance less than a threshold with respect to the pixel of the matrix from which the detected event originates, attributing the detected event to said one of the objects.

Following detection of an event attributable to at least two of the objects, it is possible to take spatial constraints into account in order to remove the ambiguity. A possibility is to associate with the detected event, for each object to which the detected event is attributable, a point of the model of this object by minimizing a respective distance criterion with respect to the pixel of the matrix from which the detected event originates, and to attribute the detected event to the object for which the minimized distance criterion is lowest. An alternative consists in assigning the detected event to none of the objects.

Another alternative consists in assigning the detected event to each of the objects to which the detected event is attributable. Updating the models of objects to which the detected event is attributed may be carried out with weightings that depend on the distance criteria respectively minimized for said objects.

Following detection of an event attributable to at least two objects, it is also possible to take time constraints into account in order to remove the ambiguity. A possibility is, for each object, to estimate a rate of events attributed to it and memorize the instant at which was detected the last event that was attributed to it. An event attributable to at least two objects is then attributed to the one of the objects for which the product of the estimated rate of events by the time interval between the memorized instant and the instant of detection of said event is closest to 1.

In an embodiment of the method, determining the updated model comprises estimating a spatial transformation defined by a set of parameters, and applying the estimated spatial transformation to the model. Estimating the spatial transformation comprises calculating said parameters as a function of a gradient of a distance, in the plane of the matrix of pixels, between the pixel of the matrix from which the detected event originates and a point obtained by applying the spatial transformation to the point of the model associated with the detected event.

A particular case is the one where the spatial transformation is a rigid transformation, including a translation and a rotation in the plane of the matrix of pixels. A possibility is to take for the translation a vector $\Delta T$ equal to $-\eta_1 \cdot \nabla_T f(\Delta \theta_0, \Delta T_0)$ and for the rotation an angle $\Delta \theta$ equal to $-\eta_2 \cdot \nabla_\theta f(\Delta \theta_0, \Delta T_0)$, where $\eta_1$ and $\eta_2$ are predefined positive convergence steps and $\Delta \theta_0$ and $\Delta T_0$ are particular values of the angle of rotation and of the translation vector. For example, $\Delta \theta_0 = m\hat{c}p$ and $\Delta T_0 = cp - R_{\Delta \theta_0}$ [cm] can be taken, where p designates the pixel of the matrix from which the detected event originates, m designates the point of the model associated with the detected event, c designates the center of the rotation, cp designates a vector pointing from c to p, cm designates a vector pointing from c to m, and $R_{\Delta \theta_0}[.]$ is the rotation of center c and of angle $\Delta \theta_0$.

Another case of interest is the one where the spatial transformation is an affine transformation further including application of respective scaling factors according to two axes included in the matrix of pixels. The scaling factors $s_x$, $s_y$ along the two axes x, y may be calculated according to $s_x = 1 + \eta_3 \cdot (|p_x| - |m_x|)$ and $s_y = 1 + \eta_3 \cdot (|p_y| - |m_y|)$, respectively, where $\eta_3$ is a predefined positive convergence step, $p_x$ and $p_y$ are the coordinates along the axes x and y of the pixel of the matrix from which the detected event originates, and $m_x$ and $m_y$ are the coordinates along the axes x and y of the point of the model associated with the detected event.

Another aspect of the present invention relates to a device for tracking shape in a scene, comprising a computer configured to execute a method such as defined hereinabove using asynchronous information received from a light sensor.

BRIEF DESCRIPTION OF THE DRAWINGS

Other features and advantages of the present invention will appear in the description hereinafter, in reference to the annexed drawings, wherein.

DESCRIPTION OF EMBODIMENTS

Figure 1:
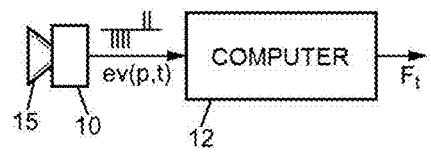
FIG. 1 is a block diagram of a device adapted to implementation of the invention.

The device shown in FIG. 1 comprises an event-based asynchronous vision sensor 10 placed facing a scene and receiving the light flow of the scene through optics for acquisition 15 comprising one or several lenses. The sensor 10 is placed in the image plane of the optics for acquisition 15. It comprises a group of photosensitive elements organized into a matrix of pixels. Each pixel corresponding to a photosensitive element produced from the successive events depending on variations of light in the scene.

A computer 20 processes the asynchronous information originating from the sensor 10, i.e. the sequences of events ev(p, t) received asynchronously from the various pixels p, in order to extract therefrom information $F_t$ on certain shapes changing in the scene. The computer 20 operates on digital signals. It can be implemented by programming a suitable processor. A hardware implementation of the computer 20 using specialized logic circuits (ASIC, FPGA, . . . ) is also possible.

For each pixel p of the matrix, the sensor 10 generates an event-based asynchronous signal sequence using the variations of light detected by the pixel in the scene that appears in the field of vision of the sensor.

Figure 2A:
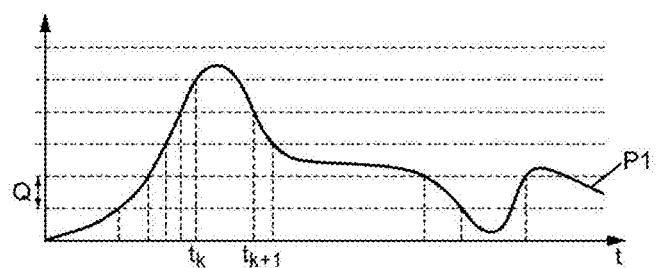
FIG. 2A is a diagram showing an example of a profile of light intensity on a pixel of an asynchronous sensor.
Figure 2B:
FIG. 2B shows an example of a signal delivered by the asynchronous sensor in response to the intensity profile of FIG. 2A.
Figure 2C:
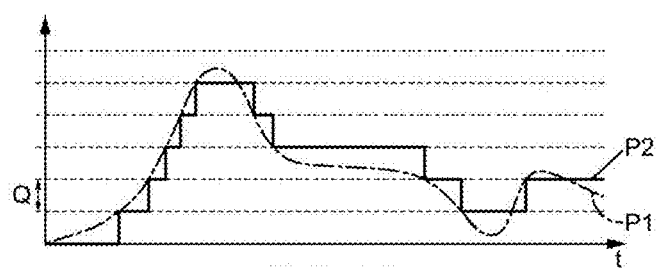
FIG. 2C shows the reconstruction of the intensity profile using the signal of FIG. 2B.

The asynchronous sensor carries out an acquisition for example according to the principle shown by FIGS. 2A-C. The information delivered by the sensor comprises a succession of instants $t_k$ (k=0, 1, 2, . . . ) with which an activation threshold Q is reached. FIG. 2A shows an example of a light intensity profile P1 seen by a pixel of the matrix of the sensor. Each time this intensity increases by a quantity equal to the activation threshold Q starting from what it was in time $t_k$, a new instant $t_{k+1}$ is identified and a positive spike (level +1 in FIG. 2B) is emitted at this instant $t_{k+1}$. Symmetrically, each time that the intensity of the pixel decreases by the quantity Q starting from what it was in time $t_k$, a new instant $t_{k+1}$ is identified and a negative spike (level −1 in FIG. 2B) is emitted at this instant $t_{k+1}$. The asynchronous signal sequence for the pixel then consists in a succession of positive or negative pulses or spikes positioned over time at instants $t_k$ depending on the light profile for the pixel. These spikes can be shown mathematically via positive or negative Dirac peaks and are each characterized by an instant of emission $t_k$ and a sign bit. The output of the sensor 10 is then in the form of an address-event representation (AER). FIG. 2C shows the intensity profile P2 that is cable of being reconstructed as an approximation of the profile P1 via integration over time of the asynchronous signal of FIG. 2B.

Figure 3A:
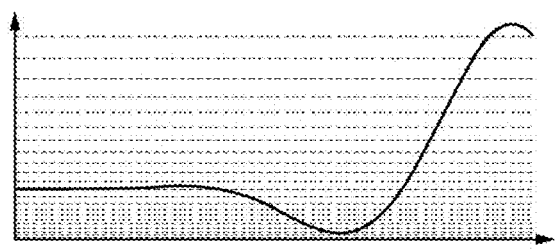
FIGS. 3A-B are diagrams similar to those of FIGS. 2A-B showing a method for light acquisition that can be used in another embodiment of the method.
Figure 3B:
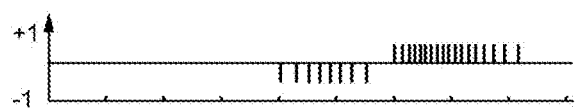

The activation threshold Q can be set, as in the case of FIGS. 2A-C, or can adapt according to the light intensity, as in the case of FIGS. 3A-B. For example, the threshold ±Q can be compared to the variations in the light intensity logarithm for the generating of an event ±1.

By way of example, the sensor 10 can be a dynamic vision sensor (DVS) of the type described in "A 128×128 120 dB 15 µs Latency Asynchronous Temporal Contrast Vision Sensor", P. Lichtsteiner, et al., IEEE Journal of Solid-State Circuits, Vol. 43, No. 2, February 2008, pp. 566-576, or in patent application US 2008/0135731 A1. The dynamics of a retina (minimum duration between the action potentials) of about a few milliseconds can be approached with a DVS of this type. The performance dynamically is in any case largely superior to that that can be achieved with a conventional video camera that has a realistic sampling frequency. Note that the shape of the asynchronous signal delivered for a pixel by the DVS 10, which constitutes the input signal of the computer 20, can be different from a succession of Dirac peaks, as the events shown can have any temporal width or amplitude or waveform in the event-based asynchronous signal.

Another example of an asynchronous sensor that can be used advantageously in the context of this invention is the asynchronous time-based image sensor (ATIS) of which a description is given in the article "A QVGA 143 dB Dynamic Range Frame-Free PWM Image Sensor With Lossless Pixel-Level Video Compression and Time-Domain CDS", C. Posch, et al., IEEE Journal of Solid-State Circuits, Vol. 46, No. 1, January 2011, pp. 259-275.

Figure 4:
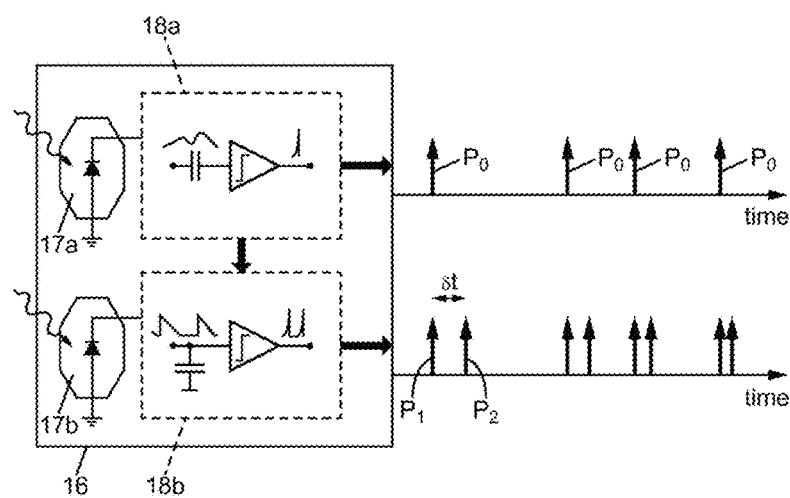
FIG. 4 is a block diagram of an asynchronous light sensor of the ATIS type.

FIG. 4 shows the principle of the ATIS. A pixel 16 of the matrix constituting the sensor comprises two photosensitive elements 17a, 17b, such as photodiodes, respectively associated with electronic detection circuits 18a, 18b. The sensor 17a and its circuit 18a have an operation similar to those of the DVS mentioned hereinabove. They produce a pulse $P_0$ when the light intensity received by the photodiode 17a varies by a predefined quantity. The pulse $P_0$ that marks this change in intensity triggers the electronic circuit 18b associated with the other photodiode 17b. This circuit 18b then generates a first pulse $P_1$ then a second pulse $P_2$ as soon as a given quantity of light (number of photons) is received by the photodiode 17b. The time shift δt between the pulses $P_1$ and $P_2$ is inversely proportional to the light intensity received by the pixel 16 just after the appearance of the pulse $P_0$. The asynchronous information originating from the ATIS is another form of AER representation, comprising two pulse trains for each pixel: the first train of pulses $P_0$ indicates the instants when the light intensity has changed beyond the detection threshold, while the second train is comprised of pulses $P_1$ and $P_2$ of which the time shift δt indicates corresponding light intensities, or levels of gray. An event ev(p, t) coming from a pixel 16 of position p in the matrix of the ATIS then comprises two types of information: time information given by the position of the pulse $P_0$, giving the instant t of the event, and grayscale information given by the time shift δt between the pulses $P_1$ and $P_2$.

Figure 5:
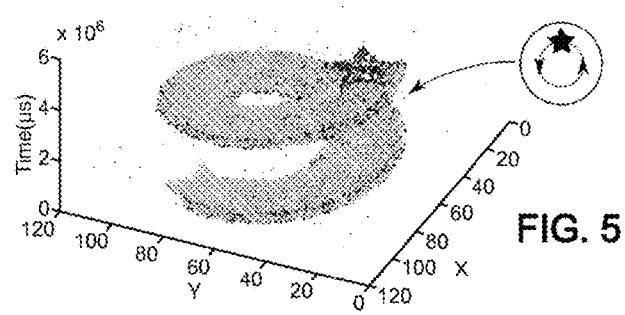
FIG. 5 is a diagram showing events generated by an asynchronous sensor placed opposite a scene comprising a rotating star.

In the case where the sensor 10 consists of a two-dimensional matrix of pixels, the events originating from pixels can be placed in a three-dimensional space-time representation such as shown in FIG. 5. In this figure, each point marks an event ev(p, t) asynchronously generated at an instant t on a pixel p of the sensor, with position $$p = \begin{pmatrix} x \\ y \end{pmatrix},$$

via the motion of a star rotating at a constant angular speed as diagrammed in the inset A. The major portion of these points are distributed in the vicinity of a surface with a generally helical shape. Furthermore, the figure shows a certain number of number of events at a distance from the helical surface which are measured without corresponding to the effective movement of the star. These events are acquisition noise.

The principle of an ICP algorithm is to use a set of points forming a model representing the shape of an object, for example describing the contour of this object, in order to have it correspond with a set of points provided by acquisition data, then to calculate the geometrical relationship between this set of points and the model by minimizing an error function.

Figure 6A:
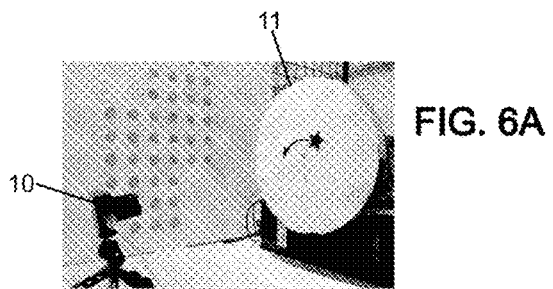
FIG. 6A and a view of a piece of equipment used to test the operation of the method of tracking shape according to the invention.
Figure 6B:
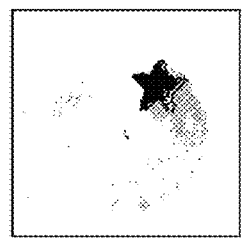
FIG. 6B shows an example of an event accumulation card obtained in the configuration of FIG. 5A.

FIG. 6A shows the equipment used in an experiment of the invention, the sensor 10, for example of the DVS or ATIS type, being placed facing a rotating plate 11 wherein a star shape is drawn. The sensor 10 acquires data using the rotation of the star shape on the plateau. For purposes of comparison and illustration only, FIG. 6B diagrammatically shows the events observed during a time interval of about a few microseconds, superimposed on the black shape of the star.

Figure 7:
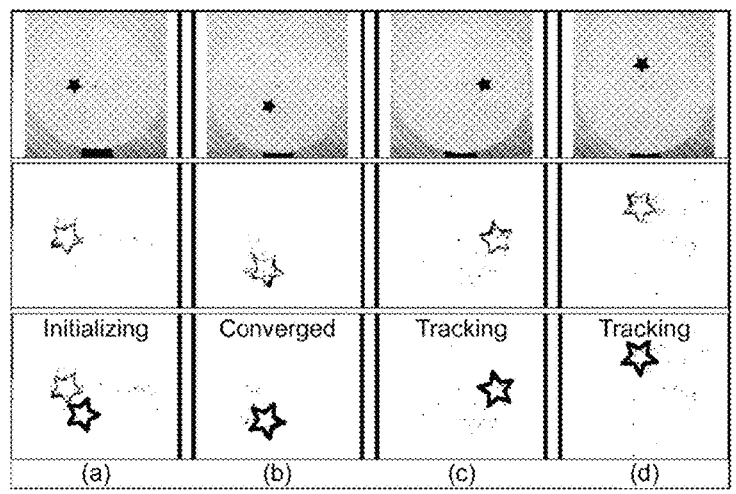
FIG. 7 shows various images in order to show the operation of an ICP algorithm in the example of a rotating star.

FIG. 7 shows, by way of illustration, an example of tracking the star shape. In this figure, the top row is a conventional sequence of images showing the star in rotation on its plate, as in the case of FIG. 6A. The middle row shows event accumulation maps, i.e. the projection of all of the events that have occurred during a time period on a plane, independently of the precise instants for detecting events in the time period. Finally, the bottom row shows the matching of the model (shown as a solid line) with the acquisition points. In the left-hand column (a), an initial state is shown where the star begins to rotate. The algorithm tries to match the model with the closest events. An initial position of the model that is not excessively far from the events is useful for the algorithm to converge towards the global minimum. In the column (b), the star passes in the vicinity of the initial position of the model, and the latter converges towards the position of the star. Finally, in the columns (c) and (d), the star continues to rotate and the model is updated by applying to it a rotation $R_{\Delta\theta}$ and a translation $\Delta T$ of which the parameters are calculated by minimizing an error function.

In the case where the scene is observed by an event-based asynchronous sensor rather than by a conventional camera, the events are received with a precise time stamping as they occur. An ICP type of algorithm does not need to wait to have information on the entire extent of the scene in order to be able to simultaneously process all the events that it contains.

An event ev(p, t) describes an activity in the space-time domain. In the event-based version of the ICP algorithm shown in FIG. 8, it is considered, similarly to biological neurons, that each event exerts an influence for a certain lapse of time after it appears. This temporal property of events can be introduced in the form of a persistence function. S(t) then denotes the space-time set of events that are active at an instant t:

$$S(t) = \{ev(p,t')/0 < t - t' \leq \Delta t\} \quad (2)$$

where $\Delta t$ is a persistence time. After the time interval $\Delta t$ has elapsed following activation of an event, this event is eliminated from the set S(t).

Matching the points between the model and the acquisition data constitutes the most demanding step in terms of calculation resource. G(t) denotes the set of positions of the points of the two-dimensional model defining the shape of the object at an instant t. The association between the acquisition points and the points of the model can be carried out sequentially. Each time a new event is activated, it is matched with an element of G(t), preferably with an element of G(t) that has not already been associated with an event of S(t). It is possible to add to this step a verification of a distance criterion in order to reject noise or other points that are not part of the shape sought.

Because the sensor is asynchronous, the number of associated points varies rather substantially. There are typically from a few points to a few hundred points associated during the persistence time $\Delta t$. This is very different from the conventional frame-based approach. Immobile objects do not generate any stimulus, so that it is not necessary to update their position. When the scene comprises little motion, only a small part of the calculation resources are used, while in highly dynamic situations, the algorithm requires full capacity in order to update the information.

Figure 8:
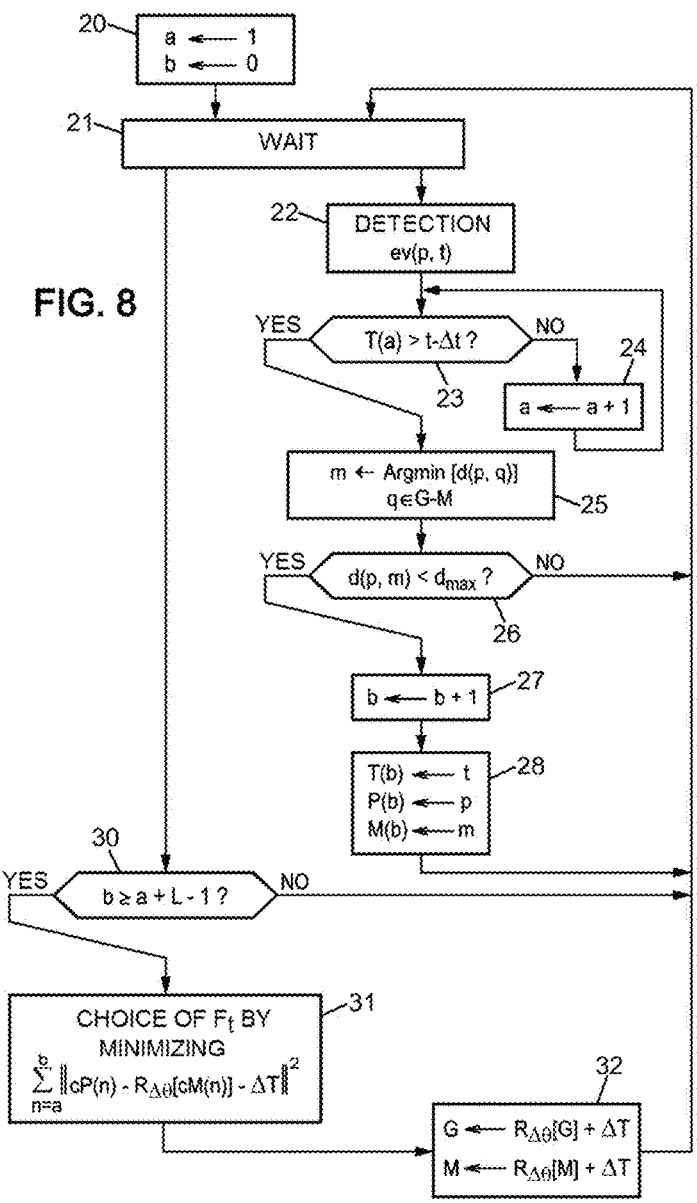
FIG. 8 is a flow chart of an example of an algorithm that can be used in certain implementations of the invention.

In the example of FIG. 8, P(n) and T(n) denote the position and the detection time of the n-th event retained for the updating of the position information of the model, and M(n) the point of the model associated with this n-th event. The detection times T(n) are initialized at arbitrarily large values before starting the algorithm (T(n)=+∞). Upon detection of an event ev(p, t) at time t, the integer index a designates the oldest event in S(t) while the integer index b designates the most recent event in S(t), i.e. S(t)={ev(P(a), T(a)), ev(P(a+1), T(a+1)), ..., ev(P(b), T(b))}. The model G(t) is simply noted as G, and M denotes the set of points of the model that have been associated with the events of S(t), i.e. M={M(a), M(a+1), ..., M(b)}. When the algorithm is initialized (step 20), the integer indexes a and b are respectively initialized at 1 and to 0.

In the version of the algorithm shown in FIG. 8, the spatial transformation $F_t$ that matches the points of the model with the positions of the detected events is estimated periodically, by a conventional solution in analytical form, for example by breaking down into singular values (SVD, "singular value decomposition"). In the step 21, the algorithm waits for the new events originating from the sensor 10 as long as the updating period of the spatial transformation has not elapsed.

Following reception of an event ev(p, t) originating from a pixel of position p in the matrix at time t (step 22), two operations are carried out: updating the set S(t) and associating with the detected event a point of the model G. In the loop 23-24, the events dating by more than $\Delta t$ are eliminated from S(t): test 23 checks if the time T(a) is greater than $t-\Delta t$. If T(a) is not greater than $t-\Delta t$, the number a is incremented by one unit in the step 24 and test 23 is reiterated. Too old events are eliminated when $T(a) > t-\Delta t$ at test 23.

The algorithm then proceeds with associating a point of G with the new event in step 25. This associated point is the one of which the position m is closest to the pixel p from which originates the event ev(p, t) among the points of the model that have not already been associated with a point of the set S(t), i.e. among the points of the set GM:

$$m = \underset{q \in G-M}{\text{Argmin}}[d(p, q)] \quad (3)$$

The distance criterion d(.,.) used in this step 25 is for example the Euclidean distance in the plane of the matrix. Before deciding if the event ev(p, t) will be included in the set S(t), the algorithm examine in the step 26 if the minimized distance is less than a threshold $d_{max}$. By way of example, the threshold $d_{max}$ can be chosen as corresponding to 6 pixels. A different threshold value can naturally be retained if tests show that it is better suited to a particular application. If $d(p, m) \geq d_{max}$, the event is set aside and the algorithm returns to the step 21 of waiting for the next event.

If the event is attributed to the object sought ($d(p, m) < d_{max}$ at the test 26), the index b is incremented by one unit in step 27, then the detection time t, the position p of this event and the point m of the model that has just been associated with it are recorded as T(b), P(b) and M(b) in the step 28. The processing consecutive to the detection of the event ev(p, t) is then terminated and the algorithm returns to the step 21 of waiting for the next event.

At the expiration of the updating period of the spatial transformation, a test 30 is carried out in order to ensure that a sufficient number of events are present in the set S(t) in order to contribute to the updating, for example L=5 events. Hence, if $b < a+L-1$ (test 30), no updating is carried out and the algorithm returns to the step 21 of waiting for the next event.

If there are enough events ($b \geq a+L-1$), a minimization operation 31 is carried out in order to choose an angle of rotation $\Delta\theta$ and a vector of translation $\Delta T$ in the case where the spatial transformation $F_t$, that is sought using the model G, is a combination of a rotation $R_{\Delta\theta}$ of angle $\Delta\theta$ and of a translation of vector $\Delta T$.

Figure 9:
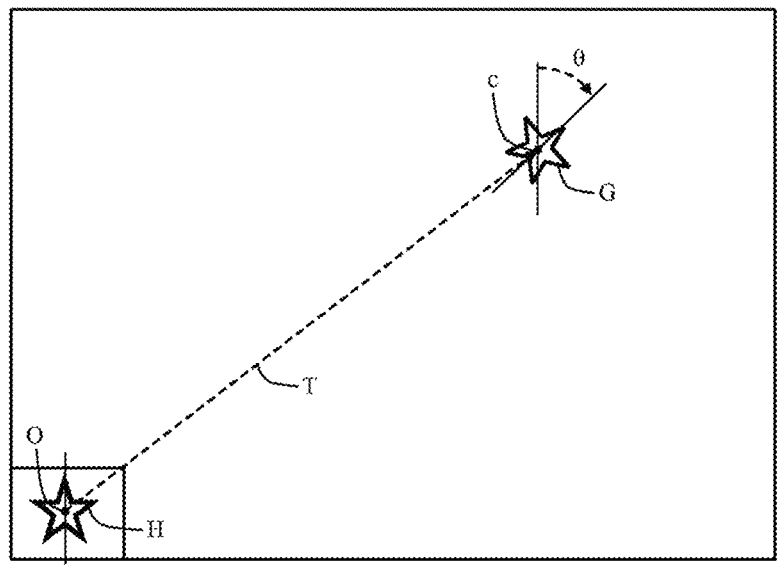
FIGS. 9 and 10 are diagrams that show geometrical elements used to describe certain embodiments of the invention.

FIG. 9 provides the notations used here. H denotes the pattern of points defining the shape tracked in the scene, placed at a fixed position, and O the center of gravity of this set of points H. At an instant t, this pattern H is displaced according to a vector translation T and a rotation of angle θ around its center of gravity O, which gives the model G=G(t) to which reference is made during the processing of an event received at time t. The processing gives rise to the estimation of variations Δθ, ΔT of the angle of rotation θ and of the translation vector T.

The minimization operation 31 consists in finding the parameters Δθ, ΔT that minimize a criterion of distance such as for example a sum of the form:

$$\sum_{n=a}^{b} \|cP(n) - R_{\Delta\theta}[cM(n)] - \Delta T\|^2 \qquad (4)$$

which is a particular case of expression (1) where the parameters to be estimated are the angle Δθ of the rotation $R_{\Delta\theta}$, defined by the matrix $$R_{\Delta\theta} = \begin{bmatrix} \cos\Delta\theta & -\sin\Delta\theta \\ \sin\Delta\theta & \cos\Delta\theta \end{bmatrix},$$

and the coordinates of the vector ΔT. In the expression (4), the notations cP(n) and cM(n) represent the vectors that have for origin the center c of the rotation $R_{\Delta\theta}$ and pointing respectively to P(n) and M(n). The position of the center c of the rotation $R_{\Delta\theta}$ can be defined in relation to model G(t). For example, it is possible to place the point c at the center of gravity of the points of the model G(t), as shown in FIG. 9 (the vector T of the global translation is then equal to the vector Oc).

Figure 10:
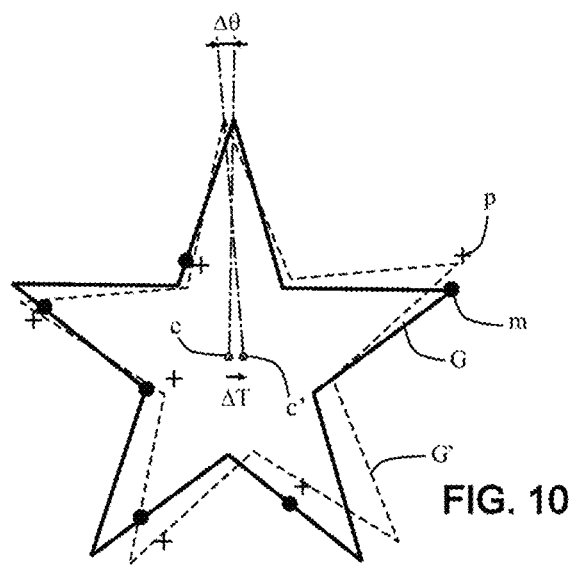

The spatial transformation $F_t$ comprised of the rotation $R_{\Delta\theta}$ and of the translation ΔT is here the one that moves the model G(t) to bring it as close as possible to the pixels where the events recently taken into account were detected, i.e. events of the set S(t). This is what is shown in FIG. 10, where the signs + represent the positions of the pixels P(n) where the events of S(t) were detected, the signs • represent the positions of the points M(n) of the model G that were associated with these events, and G' represents the next model, of center c', that places the points M(n) as close as possible to the pixels P(n) and results from a displacement of G according to the rotation $R_{\Delta\theta}$ and the vector translation ΔT.

The rotation $R_{\Delta\theta}$ and the translation ΔT that minimize the criterion (4) reveal the motion of the shape corresponding to the model G between the updating instant of the spatial transformation and the preceding updating instant. In step 32, the same transformation is applied to the points of the sets G and M in order to update these two sets. Each position X of the model G (or of the set M) is replaced with a position Y such that $cY = R_{\Delta\theta}[cX] + \Delta T$. After step 32, the algorithm returns to the step 21 of waiting for the next event.

The special transformations $F_t$ thus characterized by the angles Δθ of the rotations $R_{\Delta\theta}$ estimated successively and by the corresponding vectors of translation ΔT represent the motions of the shape tracked in the scene. Their parameters are the outputs of the computer 20 of FIG. 1. It is possible to accumulate the values Δθ and ΔT determined successively in order to obtain the angles θ and the vectors of translation T defined in relation to the fixed reference position of the shape H.

The embodiment shown in FIG. 8 makes it possible to control the updating frequency of the tracking information of the shape sought in the scene, i.e. parameters of the spatial transformation $F_t$. Typically, this updating frequency corresponds to a periodicity between 10 μs and 1 ms. It can therefore be faster than the frame frequencies of conventional cameras.

The persistence time Δt is set according to the dynamic content of the scene. In an implementation based on SVD calculations, it is desirable that the time interval Δt is long enough so that the set S(t) retains a complete contour of the mobile object sought, in such a way that almost all of the points of this contour can be put into correspondence with events. On the other hand, an excessively long duration Δt increases the calculation load, and does not make it possible to correctly track fast objects. The duration Δt is typically chosen between 10 μs and 20 ms.

Figure 11:
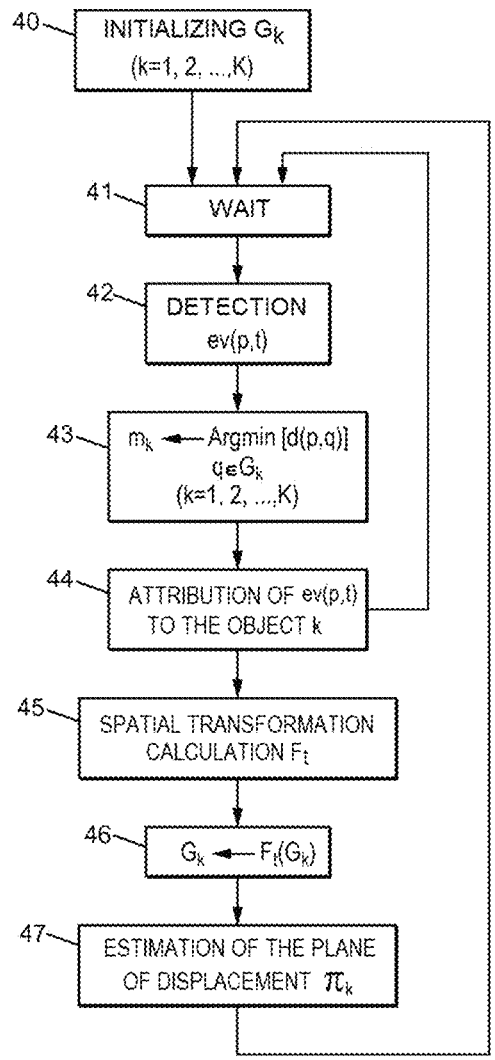
FIG. 11 is a flow chart of an example of an algorithm that can be used in other implementations of the invention.

Another approach in shape tracking in the scene seen by the asynchronous sensor 10 is shown in FIG. 11. In this approach, which provide better dynamics while still requiring less calculations, the spatial transformation $F_t$ which makes it possible to update the updated model is determined according to the pixel p of the matrix from which originates a detected event ev(p, t) (in so much as this event has been attributed to the object sought) and of the associated point m, independently of the associations performed before the detection of the event ev(p, t).

In the embodiment of FIG. 11, it is considered that a number K of objects are sought in the scene observed by the asynchronous sensor. These objects are numbered by an integer k (k=1, 2, . . . , K), and each one has a model of points noted as $G_k(t)$ or simply $G_k$. The frequent case where a single object is tracked is included by taking K=1.

In order to initiate the tracking of each object k, its model $G_k$ is initialized (step 40) with a positioning that is rather close to that of this object in the field of vision of the sensor 10. Then, in step 41, the algorithm waits for the new events originating from the sensor 10.

Following reception of an event ev(p, t) originating from a pixel of position p in the matrix in the time t (step 42), a step 43 of associating a point $m_k$ of the model $G_k$ with the detected event is carried out for each object k (k=1, 2, . . . , K). For each object k, step 43 is identical to step 25 described hereinabove in reference to FIG. 8, except that the point $m_k$ of the model $G_k$ that minimizes the distance criterion $d(m_k, p)$ is chosen without excluding points that were previously associated with events, as the algorithm does not memorize the prior associations with the event ev(p, t).

In step 44, the event ev(p, t) which was detected in step 42 is attributed to an object k or, lacking this, excluded as not being in relation with the motion of a tracked object in the scene. If the event ev(p, t) is not attributed to any object, the algorithm returns to step 41 of waiting for the next event. In the case of attribution to an object k, the spatial transformation $F_t$ is calculated in the step 45 for the model $G_k$ of this object.

Several tests or filtering can be carried out in step 44 in order to make the decision whether or not to attribute the event ev(p, t) to an object k.

The simplest is to proceed as in step 26 described hereinabove in reference to FIG. 8, by comparing the distance $d(m_k, p)$ to a threshold $d_{max}$. If $d(m_k, p) < d_{max}$, the association of the pixel p with the point $m_k$ of the model $G_k$ is confirmed, and if no object satisfies this condition, no attribution is carried out. It may occur however that several tracked objects satisfy this condition, while one may occult another. In order to resolve these ambiguous cases, including the cases of occlusion between objects, several techniques can be applied, that use either spatial constraints, or time constraints. These techniques will be examined hereinafter.

Another processing that can take place in step 44 is taking into account of the possible motion of the background. In particular, of the asynchronous sensor 10 is itself in motion, the fixed background is in relative displacement and generates the detection of many events which are to be excluded from the processing concerning the tracking of objects of interest. A way to take the motion of the background into account will be described hereinafter.

Once the event ev(p, t) has been attributed to an object k, the parameters of the spatial transformation $F_t$ are calculated in step 45 then this transformation $F_t$ is applied to the model $G_k$ in order to update the latter in step 46. Finally, a plane of displacement of the object k, noted as $\Pi_k$, is estimated in step 47. The algorithm then returns to the step 41 of waiting for the next event.

Being limiting to one current event p associated with a point m of the model $G_k$ in order to calculate a spatial transformation $F_t$ results in introducing a component f of a cost function:

$$f = d[p, F_t(m)] \quad (5)$$

where d[., .] is a measurement of distance in the plane of the matrix of pixels. It can in particular be a quadratic distance.

If the rigid spatial transformations are considered for the updating of the model $G_k$, a determination must be made of the angle $\Delta\theta$ of a rotation $R_{\Delta\theta}$ of a given center c and the vector $\Delta T$ of a translation, the cost function component with a quadratic distance is written:

$$f = \|cp - R_{\Delta\theta}[cm] - \Delta T\|^2 \quad (6)$$

where cp and cm designate the vectors that have for origin the center c of the rotation $R_{\Delta\theta}$ and respectively point to the points p and m.

This component f can be minimized for an infinity of pairs $(\Delta\theta, \Delta T)$, since for any angle $\Delta\theta$, the choice $\Delta T = cp - R_{\Delta\theta}[cm]$ gives f=0. The objective is to minimize a global cost function of which f is only a component. However, this component f allow for an estimation of the gradient terms $\nabla_\theta f$, $\nabla_T f$ in relation to the angle of rotation $\theta$ (or $\Delta\theta$) and to the vector of translation T (or $\Delta T$), in order to carry out a sort of gradient descent during the updating of the model $G_k$. In other terms, values of parameters are retained for the spatial transformation $F_t$:

$$\Delta T = -\eta_1 \cdot \nabla_T f(\Delta\theta_0, \Delta T_0) \quad (7)$$

$$\Delta\theta = -\eta_2 \cdot \nabla_\theta f(\Delta\theta_0, \Delta T_0) \quad (8)$$

where $\eta_1$ and $\eta_2$ are predefined positive convergence steps. By way of example, $\eta_1=0.25$ and $\eta_2=0.025$ can be taken to obtain good sensitivity. The suitable values of $\eta_1$ and $\eta_2$ are to be adjusted for each application, if necessary by performing some simulations or experiments. In (7) and (8), the partial derivatives $\nabla_\theta f$, $\nabla_T f$ are taken for suitable values $\Delta\theta_0$, $\Delta T_0$ of the angle of rotation and of the translation vector.

The partial derivatives of f have for expression:

$$\nabla_T f(\Delta\theta_0, \Delta T_0) = 2(\Delta T_0 - cp + R_{\Delta\theta_0}[cm]) \quad (9)$$

$$\nabla_\theta f(\Delta\theta_0, \Delta T_0) = 2(\Delta T_0 cp)^T R_{\Delta\theta_0 + \pi/2}[cm] \quad (10)$$

where $(.)^T$ represents the operation of transposition and $$R_{\Delta\theta_0 + \pi/2} = \begin{bmatrix} -\sin\Delta\theta_0 & -\cos\Delta\theta_0 \\ \cos\Delta\theta_0 & -\sin\Delta\theta_0 \end{bmatrix}.$$

These partial derivatives are to be calculated for the particular values of $\Delta T_0$ and $\Delta\theta_0$. The results $\nabla_T f(\Delta\theta_0, \Delta T_0)$, $\nabla_\theta f(\Delta\theta_0, \Delta T_0)$ are then injected into (7) and (8) in order to obtain the parameters $\Delta T$ and $\Delta\theta$ used in the step 46 in order to update the model $G_k$.

Figure 12:
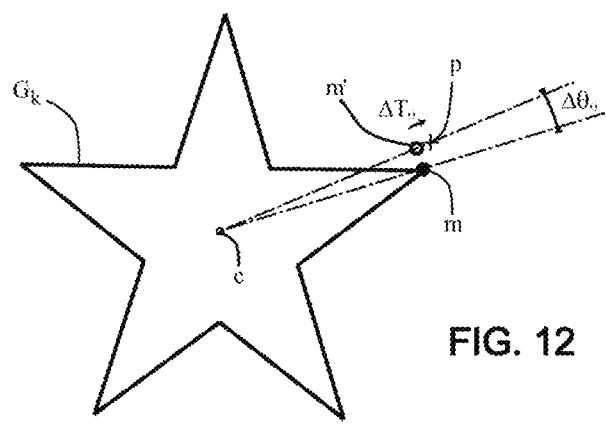
FIG. 12 is a diagram show a method for calculating the spatial transformation during an iteration of an embodiment of a method according to FIG. 11.

In an embodiment of the method, the partial derivatives are calculated according to (9) and (10) by taking for $\Delta\theta_0$ the angle mĉp and for $\Delta T_0$ the vector cp-cm', with cm'=$R_{\Delta\theta_0}$[cm]. This angle of rotation $\Delta\theta_0$ and this vector of translation $\Delta T_0$, if they were to be applied to the point m, would have it coincide with the location p of the event ev(p, t), as shown in FIG. 12. In this embodiment of the method, step 45 therefore consists in taking $\Delta\theta_0$=mĉp and $\Delta T_0$=cp-$R_{\Delta\theta_0}$[cm], in calculating the gradients $\nabla_T f(\Delta\theta_0, \Delta T_0)$, $\nabla_\theta f(\Delta\theta_0, \Delta T_0)$ according to (8)-(9) then the parameters $\Delta T$, $\Delta\theta$ of the spatial transformation $F_t$ according to (6)-(7).

Other choices are possible for the calculation (9)-(10), for example $\Delta\theta_0$=0 and $\Delta T_0$=mp (simple translation that brings m on p), or $\Delta\theta_0 = \Delta T_0 = 0$. As the elementary displacements between two iterations are of low amplitude, the precise point ($\Delta T_0$, $\Delta\theta_0$) where the partial derivatives (9)-(10) are calculated has probably little influence if it is chosen at (0, 0) or with respect to the distance between m and p. Furthermore, this choice varies according to the convention of choice of the center c of the rotation. The center of rotation c is typically the center of gravity of the points of the model $G_k$, but this is not required.

In many applications of the method, the spatial transformation $F_t$ can be represented by a combination of a rotation and of a translation as described above. Alternatives are however possible by allowing for deformations of the model $G_k$ of an object.

In particular, it is possible to take into account affine transformations $F_t$. This allows for the taking into account of three-dimensional motion of the object sought, and not only motion limited to the image plane. The 2D affine matrix stems from a matrix of rotation $R_{\Delta\theta}$ by the application of scaling factors $s_x$, $s_y$ along the two axes. This reverts to seeking to match the points m and p according to a relation of the form $$cp = R_{\Delta\theta} \cdot \begin{bmatrix} s_x & 0 \\ 0 & s_y \end{bmatrix} \cdot cm + \Delta T,$$

where the point c can again be taken at the center of gravity of the points of the model $G_k$. Through a calculation of the partial derivatives of the cost function component f in relation to scaling factors $s_x$, $s_y$ the same principle of a gradient descent can be applied in order to estimate these scaling factors. As a first approximation, it is possible to use another convergence step $\eta_3$, and take:

$$s_x = 1 + \eta_3 \cdot (|p_x| - |m_x|) \quad (11)$$

$$s_y = 1 + \eta_3 \cdot (|p_y| - |m_y|) \quad (12)$$

in order to complete the estimation of $\Delta T$ and $\Delta\theta$ according to (6) and (7). In the expressions (11) and (12), $|p_x|$ and $|p_y|$ are absolute values of the coordinates of the vector cp, and $|m_x|$ and $|m_y|$ are the absolute values of the coordinates of the vector cm.

In the case where the object k tracked in the asynchronous signal of the sensor is simply an edge being displaced at a constant speed $$v = \begin{pmatrix} v_x \\ v_y \end{pmatrix},$$

Figure 13:
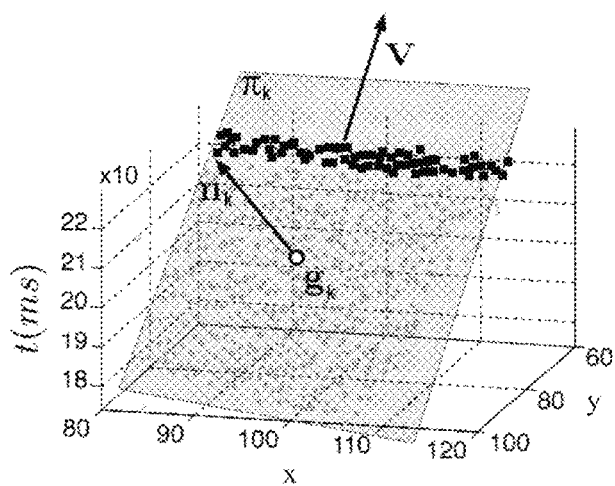
FIG. 13 is a graph that shows the points of a space with three dimensions, including two spatial dimensions and one-time dimension, wherein are recorded the events attributed to an edge in motion in the field of vision of an asynchronous sensor, and their interpolation by a plane of displacement.

FIG. 13 indicates the events attributed to this edge in a space with three dimensions, namely the two spatial dimensions x, y corresponding to the two directions of the 2D matrix of pixels and the time dimension t. The edge scans a plane $\Pi_k(t)$ according to a speed vector V included in this plane and proportional to $$\begin{pmatrix} v_x \\ v_y \\ 1 \end{pmatrix}.$$

In practice, the acquisition noise and the possible errors of attributing events to the object are such that there is a certain dispersion of the events around the plane $\Pi_k(t)$ that extends as a mean plane passed through by the events recently attributed to the object.

The plane $\Pi_k(t)$, or $\Pi_k$ if the time index t is omitted in order to simplify the notations, can be defined by any of its points $g_k(t)$, or $g_k$, and a vector $n_k(t)$, or $n_k$, giving the direction of its normal. In the representation of FIG. 13, the point $g_k$ coincides with the center of gravity of the events attributed to the object k between the instants $t-\Delta t$ and t, with $\Delta t=40$ ms. An least square fit can be used to estimate the vector $n_k$ and a point $g_k$ of the plane $\Pi_k$ by minimizing the total of the distances between the plane $\Pi_k$ and the events attributed to the object k between the instants $t-\Delta t$ and t, in particular par via a Principal Component Analysis (PCA).

This minimizing calculation is carried out in step 47 to estimate the plane $\Pi_k$ which is representative of the instantaneous displacement of the object k.

For more details on the way to determine the plane of displacement $\Pi_k$, it is possible to refer to the article "Event-based Visual Flow", by R. Benosman, et al., IEEE Transaction On Neural Networks and Learning Systems, Vol. 25, No. 2, September 2013, pp. 407-417, or to patent application WO 2013/093378 A1.

In the case where the tracked object is not a simple edge, but an object of which the shape seen by the sensor extends according to two dimensions, it is also possible to determine the plane of displacement $\Pi_k$ by minimizing the total of the distances between the recent events assigned to the object k and the plane defined by its parameters $n_k$, $g_k$. In the three-dimensional space-time representation, this plane $\Pi_k$ reveals the local displacement of the object k as a whole.

The plane of displacement $\Pi_k$ estimated for an object k can be used in several ways in step 44 of FIG. 11 in order to decide whether or not to attribute a new event ev(p, t) to the object k.

Returning to step 44, it can in particular include, in the case where several objects are tracked (K>1), resolution of occlusion cases, or more generally cases of ambiguity between several objects for the attribution of an event. In the step 43, the respective distances $d(m_k, p)$ between the event ev(p, t) and the points $m_k$ that are closest to the models $G_k$ of the various objects tracked were calculated. If only one of these distances $d(m_k, p)$ is less than a threshold $d_{th}$, for example $d_{th}=3$ pixels, then the event is attributed to this object. On the contrary, it is considered as an ambiguous event, that attributable to several different objects.

Figure 14:
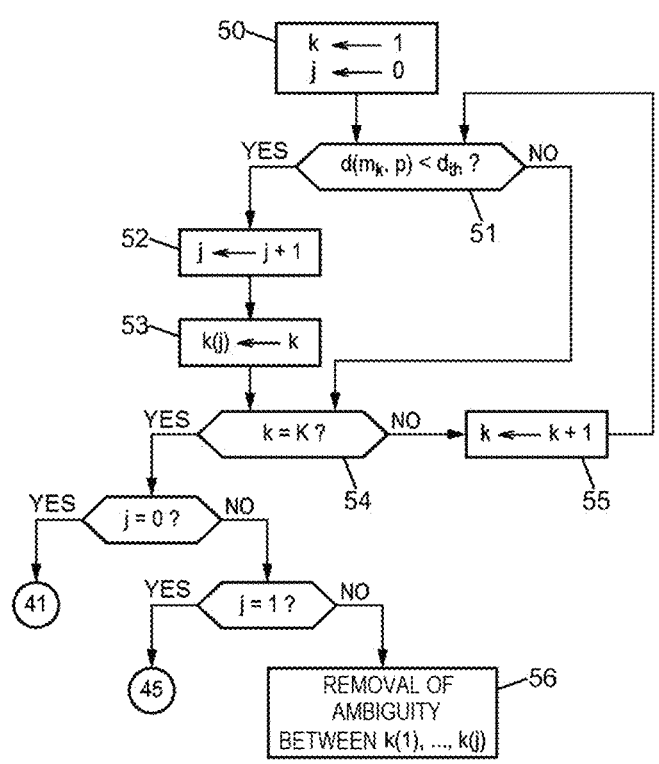
FIG. 14 is a flow chart of an example of a procedure that can be used in the step 44 of FIG. 11.

This processing is shown in FIG. 14. It begins in step 50 with an initialization of index k and j to 1 and 0, respectively. It is examined in test 51 if the distance $d(m_k, p)$ that was minimized in the step 43 is less than the threshold $d_{th}$ and in the affirmative, the index j is incremented by one unit in step 52 and the j-th entry of a table k(j) is taken equal to k in step 53. After step 53, or when $d(m_k, p) \ge d_{th}$ in test 51, it is examined in test 54 if all the objects have been examined (k=K). If k<K, test 54 is followed by incrementing by one unit the index k in step 55 and then by returning to the next test 51. When k=K at the test 54, the integer j is evaluated. If j=0, no object is considered as having its model close enough to the detected event ev(p, t), and the event is rejected (return to the step 41 of FIG. 11). If j=1, the event ev(p, t) is attributed to the object k=k(1) (passage to the step 45 of FIG. 11). If j>1, a removing of ambiguity 56 must be carried out between the objects k(1), . . . , k(j).

The taking into account of spatial constraints in the removing of ambiguities 56 can take place according to several strategies:
  Attribute to closest: a new event ev(p, t) is attributed to the object k (among k(1), . . . , k(j)) of which the model $G_k$ is the closest, i.e. the one that minimizes $d(m_k, p)$, In theory, this strategy operates correctly if the new event corresponds perfectly to the model $G_k$ and if the data does not contain any noise and in the absence of ambiguity due to the occlusions;
  Reject all: this approach simply ignores the ambiguous events, i.e. steps 45-47 of FIG. 11 are not executed for the event ev(p, t). This approach seems logical since a priori it is not possible to make a clear decision. However, the tracking can fail since there is a risk to lose the dynamics of the shape;
  Update all: all the models $G_k$ in the neighborhood of an ambiguous event ev(p, t) are updated. In other terms, the steps 45-47 of FIG. 11 are executed for each object k such that $d(m_k, p) \le d_{th}$;
  Weighted update: an ambiguous event ev(p, t) contributes to each neighboring model $G_k$ with a weighting that varies in the opposite direction of the distance. In other words, steps 45-47 of FIG. 11 are executed for each object k such that $d(m_k, p) \le d_{th}$ with a respective weighting coefficient $\alpha_k$ calculated as a decreasing function of the distance $d(m_k, p)$, for example inversely proportional to $d(m_k, p))$ and such that $\Sigma \alpha_k = 1$.

The very high temporal resolution of the event-based acquisition process provides additional information for the resolution of ambiguous situations. A current event rate $r_k$ can be determined for each shape $G_k$ being tracked, which contains information of the object k and partially codes the dynamics of this object.

Here, $t_{k,0}$, $t_{k,1}$, . . . , $t_{k,N(k)}$ denotes the time labels of the most recent events, whose number is N(k)+1, that have been attributed to an object k during a time window of which the length $\Delta t$ can be of about a few milliseconds to several tens of milliseconds, with $t_{k,0} < t_{k,1} < \ldots < t_{k,N(k)}$ (the detected event at $t_{k,N(k)}$ is therefore the most recent for the object k). These time labels make it possible to calculate for each object k a moving average of the event rate $r_k$, defined by:

$$r_k = \frac{N(k)}{t_{k,N(k)} - t_{k,0}} \quad (13)$$

This calculation of the current event rate $r_k$ can be carried out as soon as an event has been attributed to the object k (step 44) following the detection of this event at the instant $t_{k,N(k)}$.

Then, when a next event ev(p, t) gives rise to an ambiguity between several tracked objects, the step 44 can comprise the calculation of a score $C_k$ for each object k to which the ambiguous event ev(p, t) can be attributed, according to the expression:

$$C_k = t_{k,N(k)} r_k \quad (14)$$

This score $C_k$ makes it possible to evaluate the time coherency of the ambiguous event ev(p, t) with each object k. It can be expected that the duration $t-t_{k,N(k)}$ is close to the inverse of the current rate $r_k$ if the event ev(p, t) belongs to the object k. The taking into account of the time constraint in the step 44 then consists, after having calculated the score $C_k$ according to (14), in choosing from the various objects k to which the event ev(p, t) is attributable, the one for which the score is closest to 1. Once this choice has been made, the rate $r_k$ can be updated for the chosen object and control can pass to step 45 of FIG. 11.

Figure 15:
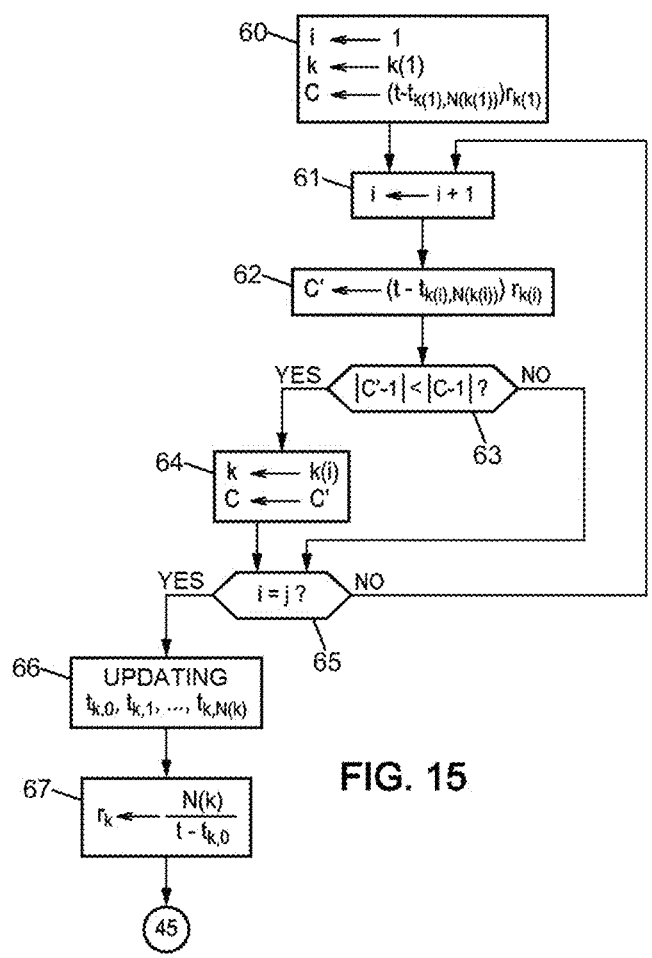
FIGS. 15 and 16 are logical diagrams of examples of procedures that can be used in the step 56 of FIG. 14.

This processing which takes into account the time constraints for removing ambiguities, and which forms a mode of execution of step 56 of FIG. 14, is shown in FIG. 15. It begins at step 60 with an initialization of an index i to 1, the index of object k being initialized to k(1) and the score C to $(t-t_{k(1),N(k(1))}) r_{k(1)}$. A loop 61-65 is executed in order to evaluate the scores $C_{k(i)}$ of the various objects to which the event ev(p, t) is attributable. In the step 61, the index i is incremented by one unit. In step 62, the score $C_{k(i)}$ of the object k(i) is calculated according to $C'=t_{k(i),N(k(1))} r_{k(1)}$. Si|C'-1|≥|C-1| (test 63), a loop exit test 65 is executed in order to compare the index i with the number j of candidate objects. If |C'-1|<|C-1| in test 63, step 64 is executed in order to replace the index k with k(i) and update C=C' before passing to the loop exit test 65. As long as i<j at test 65, the process returns to step 61 for the next iteration. When i=j, the attribution of the event to the object k was completed and the algorithm moves to step 66 of updating the number N(k) and the time labels $t_{k,0}, t_{k,1}, \ldots, t_{k,N(k)}$ for the object k which was selected. Then, the rate $r_k$ is updated according to (12) in step 67 and the algorithm moves to step 45 of FIG. 11.

Another manner for removing the ambiguity in step 56 is to combine spatial and time constraints by making reference to planes of displacement $\Pi_{k(1)}, \ldots, \Pi_{k(j)}$ of the various objects k(1), . . . , k(j) attributable to the event ev(p, t).

In particular, it is possible to retain for the attribution of the event ev(p, t) the object k which, among k(1), . . . , k(j), minimizes the distance, measured in the three-dimensional space-time representation, between the event ev(p, t) and each plane $\Pi_{k(1)}, \ldots, \Pi_{k(j)}$). The event is then attributed to the object k such that:

$$k = \underset{i=1,2,\ldots,j}{\mathrm{Argmin}} D(i) \quad (15)$$

with:

$$D(i) = |eg_{k(i)} \cdot n_{k(i)}| \quad (16)$$

where "." designates the scalar product between two vectors in the three-dimensional space, $\Pi_{k(i)}$ is the vector giving the direction of the normal to the plane $\Pi_{k(i)}$ and $eg_{k(i)}$ is the vector pointing from the point e that marks the detected event ev(p, t) in the three-dimensional space to one of the points $g_{k(i)}$ of the plane $\Pi_{k(i)}$.

Figure 16:
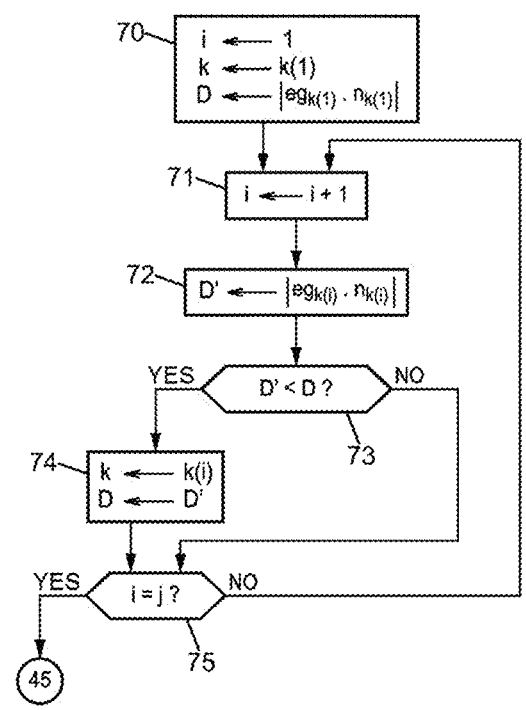

This processing that combines space and time constraints for removing ambiguities, and forming another embodiment of step 56 of FIG. 14, is shown in FIG. 16. It begins in step 70 with an initialization of an index i to 1, the index of object k being initialized to k(1) and the distance D to $|eg_{k(1)} \cdot n_{k(1)}|$. A loop 71-75 is executed in order to evaluate the distances D(i) of the various objects to which the event ev(p, t) can be attributed. In step 71, the index i is incremented by one unit. In step 72, the distance D(i) for the object k(i) is calculated according to $D=|eg_{k(i)} \cdot n_{k(i)}|$. If D'≥D (test 73), the loop exit test 75 is executed in order to compare the index i with the number j of candidate objects. If D'<D in test 73, step 74 is executed to replace the index k with k(i) and update D=D' before passing to the test 75. As long as i<j in test 75, the process returns to the step 71 for the next iteration. When i=j, the attribution of the event to the object k is completed and the algorithm moves to step 45 of FIG. 11.

Figure 17:
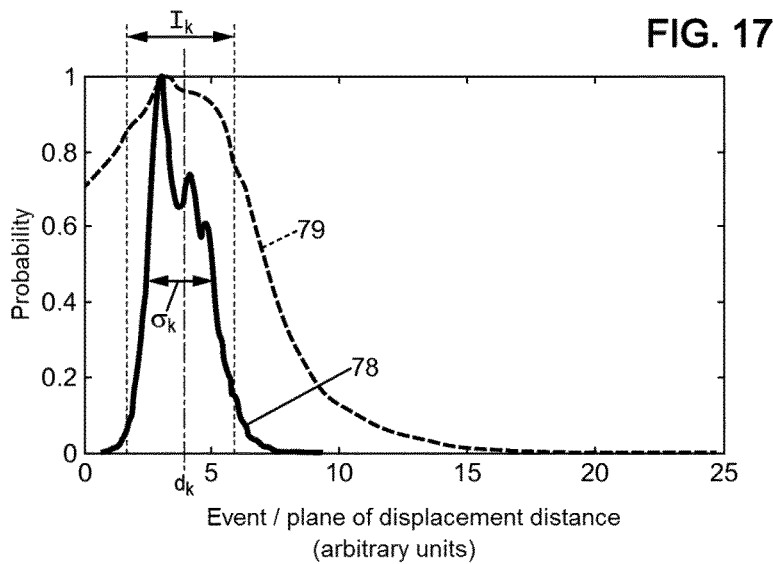
FIG. 17 is a graph that show a distribution of distances between events and a plane of displacement of the type of the one show in FIG. 13.

When the asynchronous sensor 10 is in motion, events are also generated by the fixed background of the scene. FIG. 17 shows the typical distribution of distances between the events belonging to a tracked object k and the plane of displacement $\Pi_k$ estimated for this object (curve 78), as well as the typical distribution of distance between the events belonging to the fixed background and the plane of displacement of the object (curve 79). This shows that the mean plane of displacement $\Pi_k$ can provide a discriminating criterion to separate the events concerning a tracked object k from those concerning objects that are not tracked including the background. The events that are not coherent with the tracked object or, equivalently, "too far" from the plane of displacement $\Pi_k$ are simply ignored.

One way to filter the events originated from the background of the scene then consists in estimating the statistical distribution of the distances between the plane of displacement $\Pi_k$ of the tracked object (estimated in step 47 of FIG. 11) and the points marking the detected events ev(p, t) that were attributed to this object in step 44 during a time window Δt. This statistical distribution corresponds to curve 78 of FIG. 17. It makes it possible to evaluate the mean distance $d_k$ between the plane of displacement $\Pi_k$ and the events attributed to the object as well as the standard deviation $\sigma_k$ of the distribution. Using these parameters, an interval $I_k$ is determined for the admissible distance values. When a decision must be made as to if a new detected event ev(p, t) is to be assigned to the tracked object, a calculation is made according to (16) the distance $D=|eg_k \cdot n_k|$ between the point marking the event ev(p, t) in the three-dimensional space and the plane $\Pi_k$. If this distance D falls outside of the interval $I_k$, the event is not attributed to the object k. On the contrary, the event is attributed to the object k, or subjected to other filtering, in particular in order to take into account any occlusions such as discussed hereinabove in reference to FIGS. 14-16.

For example, the interval $I_k$ is centered on the value of the mean distance $d_k$, and its width is a multiple of the standard deviation $\sigma_k$.

Figure 18:
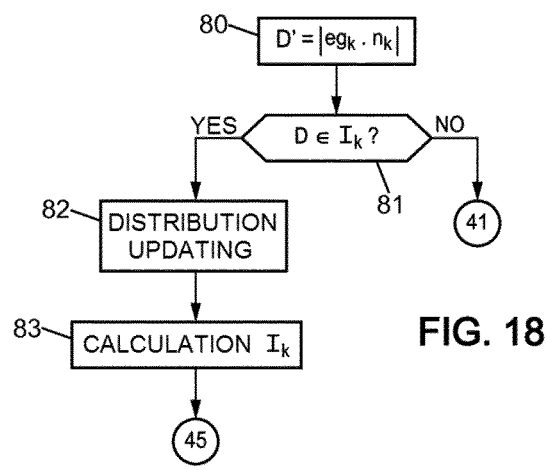
FIG. 18 is a flow chart of a procedure that can be used to estimate an interval of permissible values for distance such as shown in FIG. 17.

In order to take into account the possible motion of the background, the step 44 of FIG. 11 can comprise the processing shown in FIG. 18 (in the particular case where a single object k is tracked; this case can be easily generalized to that where K>1). After detection of the event ev(p, t) in step 42, the distance $D=|eg_k \cdot n_k|$ is calculated in step 80 then a test 81 is executed in order to determine if this distance D falls in the interval $I_k$. If D is outside of $I_k$, the process returns to step 41 of FIG. 11. If D falls in $I_k$, the event ev(p, t) is attributed to the object k rather than to the motion of the background. The distribution of the distances relatively to the plane of displacement $\Pi_k$ of the object k (curve 78) is then updated with the distance D in step 82, then the interval $I_k$ is recalculated in step 83. The process then moves to step 45 of FIG. 11.

The processing described in reference to FIGS. 14-18 was presented in the context of an embodiment of the invention according to FIG. 11. However, it will be observed that this processing, used to take into account the possible occlusions between multiple objects tracked as well as the possible motion of the background of the scene, can also be used with other embodiments of the method of tracking shape, in particular when there is recourse to a technique of the SVD type as described in reference to FIG. 8

Digital experiments were conducted in order to reveal the performance of the method disclosed hereinabove. These experiments are covered in the following examples.

Example 1

The experiment was conducted in the case of a star drawn on a rotating disk, as indicated hereinabove in reference to FIGS. 6A and 7, by seeking a rigid spatial transformation $F_t$, i.e. comprised of a translation and of a rotation in the plane of the images.

The disc was rotated at a speed of 670 revolutions per minute. The pattern H giving the shape of the model G was generated manually by selecting 6 points per edge of the star from a snapshot. A distance threshold of 6 pixels was used to eliminate the impact of noise and reduce the calculation burden. As shown by FIG. 7, the algorithm succeeds in tracking the rotating shape in an effective manner despite the high rotation speed.

Figure 19:
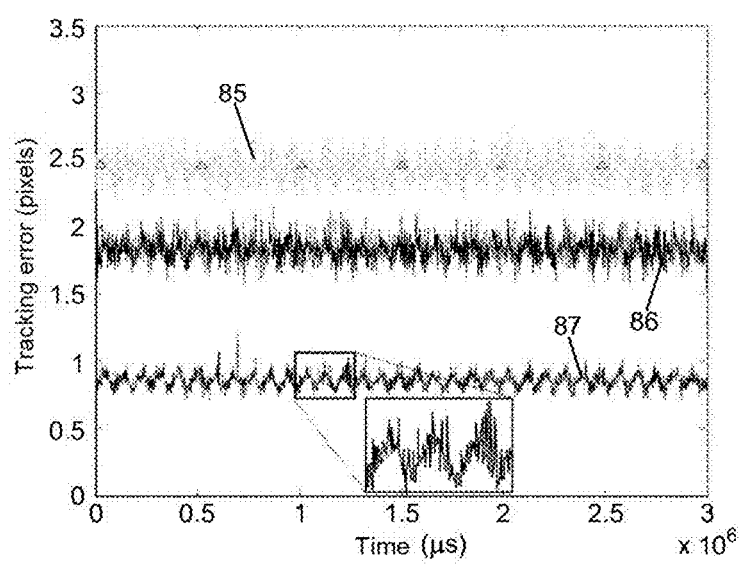
FIG. 19 is a graph that indicates tracking errors observed by applying three different tracking methods in an experiment carried out in the conditions of FIGS. 6 and 7.

FIG. 19 allows comparing the precision of the tracking of the star shape obtained with three methods of tracking:
- ICP algorithm processing the images of a conventional camera of which the output signal is comprised of frames (curve 85 in FIG. 19). In order for the comparison to be correct, only the locations of pixels remaining after differentiating the frames are considered by the ICP algorithm;
- shape tracking method using the asynchronous event-based sensor 10 with an estimation in analytical form based on an SVD approach, in the way indicated with reference to FIG. 8 (curve 86), by considering events collected over a time period of 50 μs;
- shape tracking method using the asynchronous event-based sensor 10 with estimation of the updated model according to the current association between a pixel p of the matrix from which originates an event ev(p, t) and a point m of the model, independently of the associations performed before the detection of this event, in the way indicated with reference to FIG. 11 (curve 87).

In order to evaluate the precision of the shape tracking, the mean distance between the model set and the locations of the active events is calculated every 200 μs. The mean errors are respectively 2.43, 1.83 and 0.86 pixels for the curves 85, 86 and 87, with respective standard deviations of 0.11, 0.19 and 0.20 pixels. Taking into account the asynchronous signal of the sensor allows for a notable improvement of the shape tracking method, especially in the case of FIG. 11.

The superior time precision leads to more precise tracking. The error curve shows oscillations (inset in FIG. 19) due to the repetitive rotating of the stimulus. The tracking error shows the good properties of reproducibility and reliability of algorithm. The residual error is due to the geometry of the square matrix of pixels combined with the limited spatial resolution of the sensor, which does not provide an isotropic response in relation to the angular position of the shape.

The number of points retained for the model G has an influence on the cost and the precision of the calculations.

In the case of an embodiment according to FIG. 11, it is possible to define an equivalent image rate as the inverse of the time of calculation required to process one event.

In the example, the tracking program was executed on a computer provided with a central processing unit (CPU) of the "Intel Core i5" type clocked at 2.8 GHz and occupying 25% of the capacity of this CPU. In this configuration, it appeared that a size of 90 points in the model can provide a frequency of detection that corresponds to an equivalent image rate of 200 kHz. Up to about 2000 points in the model, the latter can be updated with an equivalent image rate of at least 11 kHz. Experience has shown that for a model of 60 to 70 points, the algorithm is able to track in real time a shape that is displaced at a speed up to 1250 rpm.

Generally, there is an interest in including the corners of the contour of the object in the model. Along a straight edge of the shape of the object, it is possible however to reduce the number of points without negatively influencing the final precision of the tracking.

When the number of points increases, the tracking error does not tend to zero, but to a value of about 0.84 pixels, linked to the spatial resolution limit of the asynchronous sensor. Logically, the more points the model contains, the better the precision of the tracking is, but with a higher calculation cost. A size of 60 to 100 points for the model is a good compromise to obtain reasonable precision (around 0.90 pixels) by maintaining a high tracking frequency (around 200 kHz).

Example 2

Figure 20:
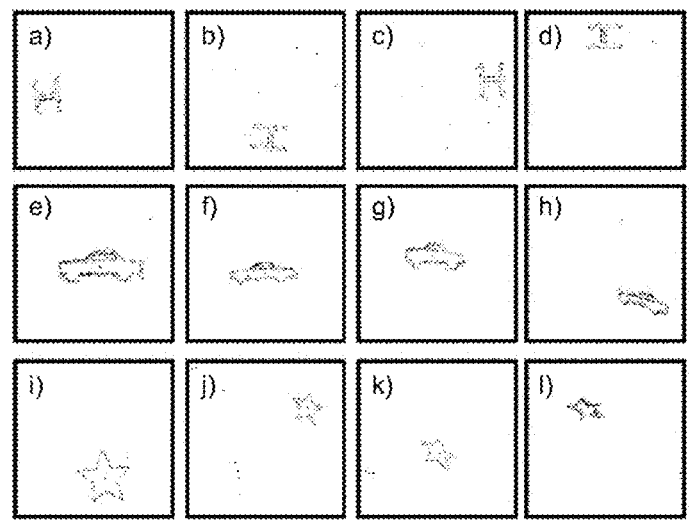
FIG. 20 is a diagram that shows the tracking of three shapes of objects in an embodiment of the invention.

The experiment was conducted in the case of several shapes (a H shape, a car shape and a star shape) by taking into account an affine spatial transformation calculated using expressions (6), (7), (11) and (12) in an embodiment according to FIG. 11. During this experiment, the shapes of the objects are deformed and resized in the way shown in FIG. 20 (a-d for the H shape, e-h for the car shape, i-l for the star shape).

Figure 21:
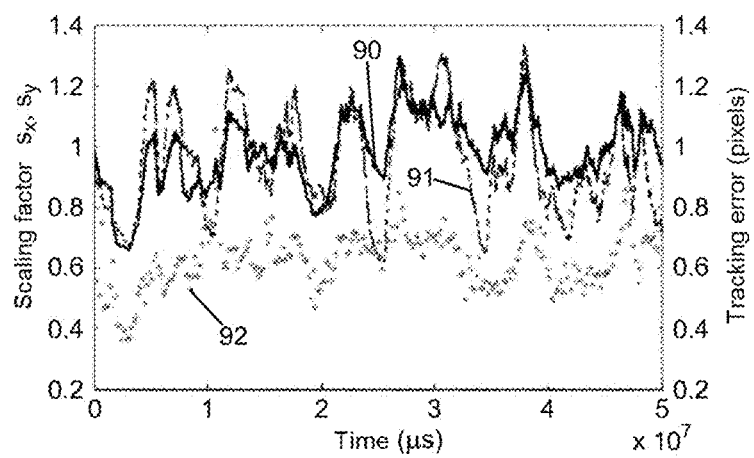
FIG. 21 is a graph that shows the results of an experiment carried out by taking into account scaling factors $s_x$, $s_y$ in the spatial transformation applied to the model of an object in an embodiment of the invention.

FIG. 21 shows the scaling factors $s_x$, $s_y$ in relation to the original size of the shape, during the tracking of the car shape (curves 90 and 91, respectively). The scale relationships are different along the two axes since the changes in perspective take place more often along the vertical axis than along the horizontal axis during the experiment. The tracking error (plotted as 92) revealed a mean value of 0.64 pixels and a standard deviation of 0.48 pixels.

The method described hereinabove in reference to FIG. 11 therefore provides good performance during the search for an affine transformation.

Example 3

Figure 22:
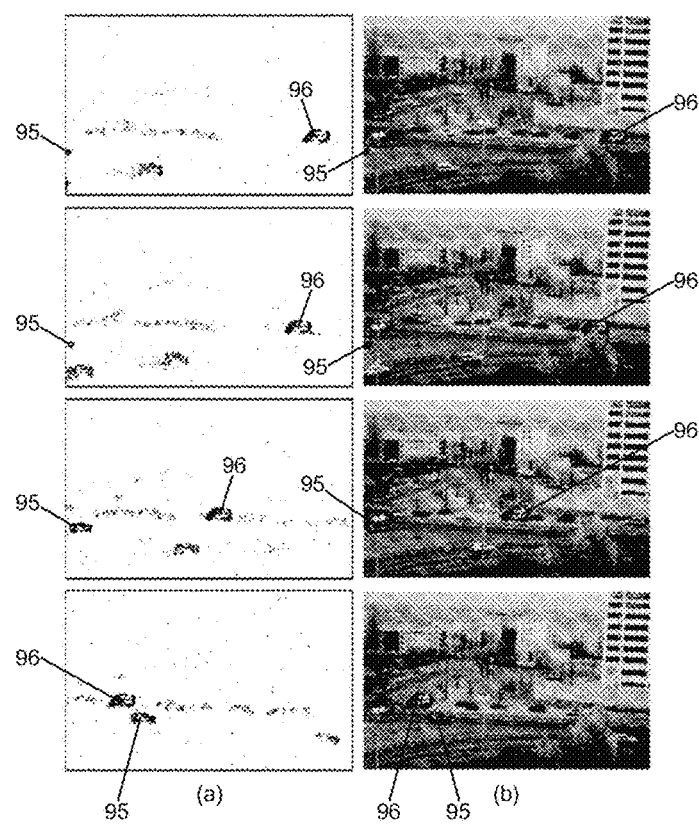
FIG. 22 shows images obtained in another experiment of the invention.

In this experience, automobile traffic data was acquired with the asynchronous sensor. As shown in FIG. 22 at four successive instants, several vehicles were moving simultaneously over several lanes. Column (a) of FIG. 22 shows the events generated by the asynchronous sensor and accumulated for a few microseconds, while column (b) shows corresponding grayscale images. It can be seen that the scene chosen has critical instants with high occlusions due to static objects (trees, lampposts, . . . ) and with mobile objects (vehicles) which formed a significant challenge for robust tracking.

Two shapes 95, 96 corresponding respectively to a car and to a truck were tracked by means of the method shown in FIG. 11, by seeking affine transformations $F_r$. The convergence steps $\eta_1$, $\eta_2$ and $\eta_3$ of the expressions (6), (7), (11) and (12) were respectively set to 0.1, to 0.002 and to $10^{-5}$. The model $G_1$ for the car included 67 points, while the model $G_2$ for the truck included 102 points. These models were generated by manually pointing the pixels of an acquired image.

Figure 23:
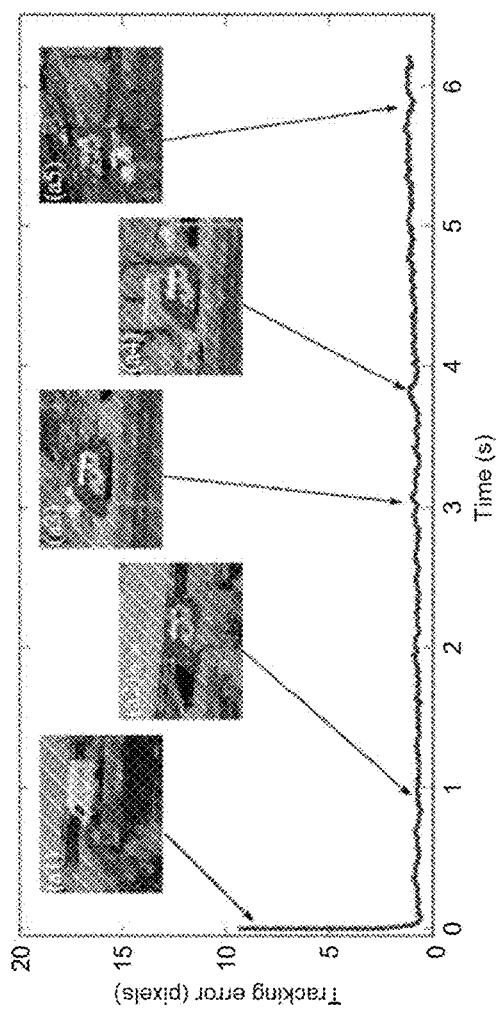
FIGS. 23 and 24 are graphs that indicate tracking errors observed by applying two different methods of tracking in the experiment of FIG. 22.
Figure 24:
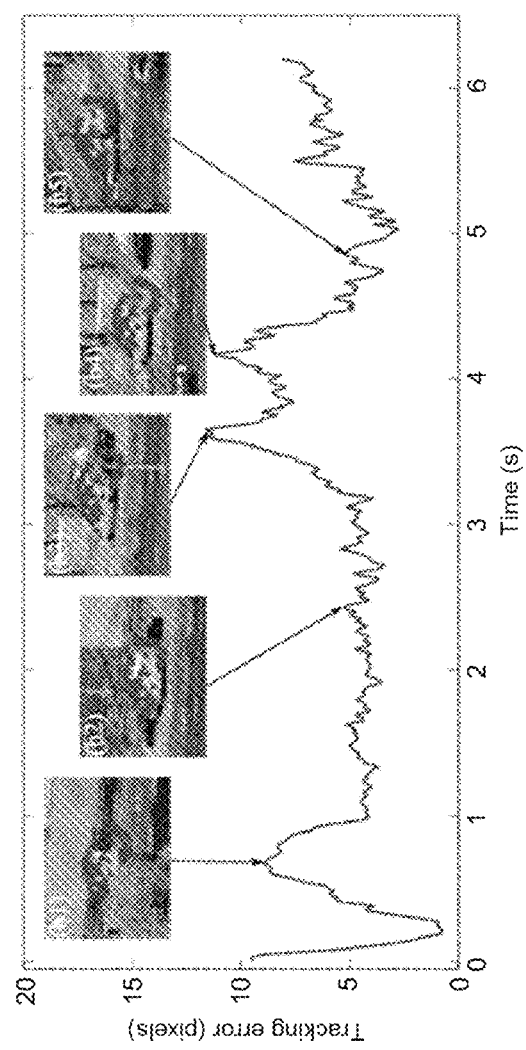

FIG. 23 shows the tracking errors observed with a method in accordance with FIG. 11 and an event-based asynchronous sensor, while FIG. 24 shows the same errors observed with a conventional method using images originating from a camera with a frame base. In order for the comparison to be pertinent, the conventional frame-based ICP technique was applied to grayscale images reconstructed at a frequency of 100 frames per second. Each image was preprocessed in order to obtain mobile edges by calculating a difference between the successive frames and by applying a thresholding operation. The temporal precision of the event-based method was about 1 μs.

The mean tracking error was 0.86 pixels with a standard deviation of 0.19 pixels for the event-based method according to FIG. 11 (FIG. 23), while the conventional frame-based method gave rise to a mean tracking error of 5.70 pixels with a standard deviation of 2.11 pixels (FIG. 24). The thumbnails (a1)-(a5) in FIG. 23 and (b1)-(b5) in FIG. 24 show situations where the "truck" object encountered occlusions, giving rise to maxima of the tracking error.

It is notable that the superior time precision procured by the method according to the invention is accompanied by better tracking stability than the conventional frame-based method. In the conventional method, the (expensive) solution consisting in increasing the acquisition frequency is not always sufficient to correctly process the situations of occlusion. Inversely, the dynamic content of the event-based signal produced by the asynchronous sensor procures more stable input data for the algorithm. The static obstacles do not generate any events and therefore have practically no impact on the tracking process.

Example 4

Several strategies for removing ambiguity have been tested for the tracking of multiple objects that can have occlusions.

The shapes of a "car" object and of a "truck" object being displaced in the same direction but with different speeds were tracked simultaneously in an actual scene comprising automobile traffic. For a time, the shapes of the truck and of the car are superimposed in the field of vision of the sensor 10, until the truck passes the car. The objects other than the truck and the car are processed as background noise.

Figure 25:
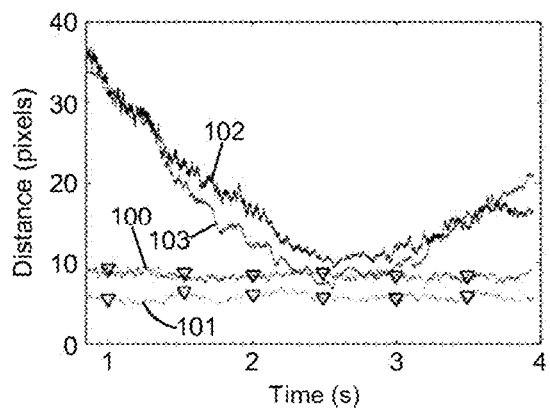
FIGS. 25 and 26 are graphs that show two possible methods for removing the ambiguity between several objects in another experiment of the invention.

FIG. 25 shows:
  the distances observed between an event originating from the "truck" object and the center of gravity of the object "truck" (curve 100);
  the distances observed between an event originating from the "car" object and the center of gravity of the "car" object (curve 101);
  the distances observed between an event originating from the "truck" object and the center of gravity of the "car" object (curve 102); and
  the distances observed between an event originating from the "truck" object and the center of gravity of the "car" object (curve 103).

Ambiguities are produced when these curves pass through similar values, meaning that the shapes of the two vehicles overlap in the field of vision (between about 2.2 and 2.9 s). In this case, the use of spatial information can be insufficient, unless the size of the common region is very small.

Figure 26:
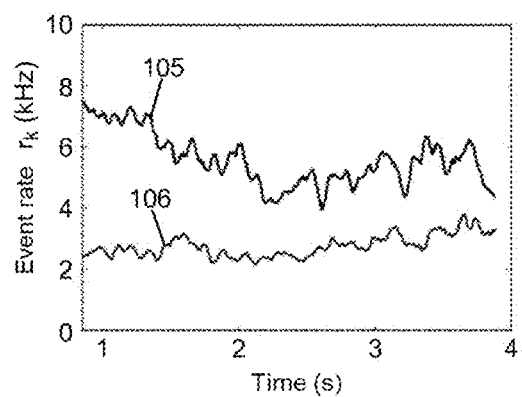

FIG. 26 shows the mean event rates $r_k$ of the "truck" object (curve 105) and of the "car" object (curve 106). In this experiment, it can be seen that the two curves are separated, such that the shapes of the two vehicles remains separable during the entire sequence referring to event rates of about 3000 events per second for the car and about 5000 events per second for the truck. However, this property of being able to be separated is not necessarily guaranteed for any sequence.

Generally, it is typically preferred to combine the time constraint with additional constraints, as for example spatial constraints.

Figure 27:
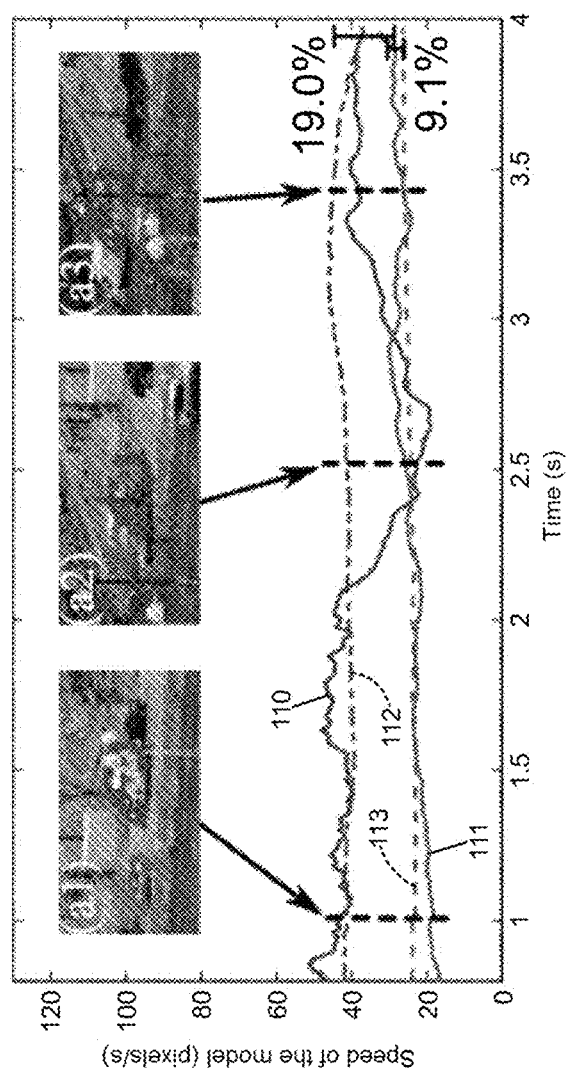
FIGS. 27-32 are graphs that indicate the speeds of models observed during the tracking of the shapes of objects in motion according to six different methods in the same experiment as FIGS. 25-26.
Figure 28:
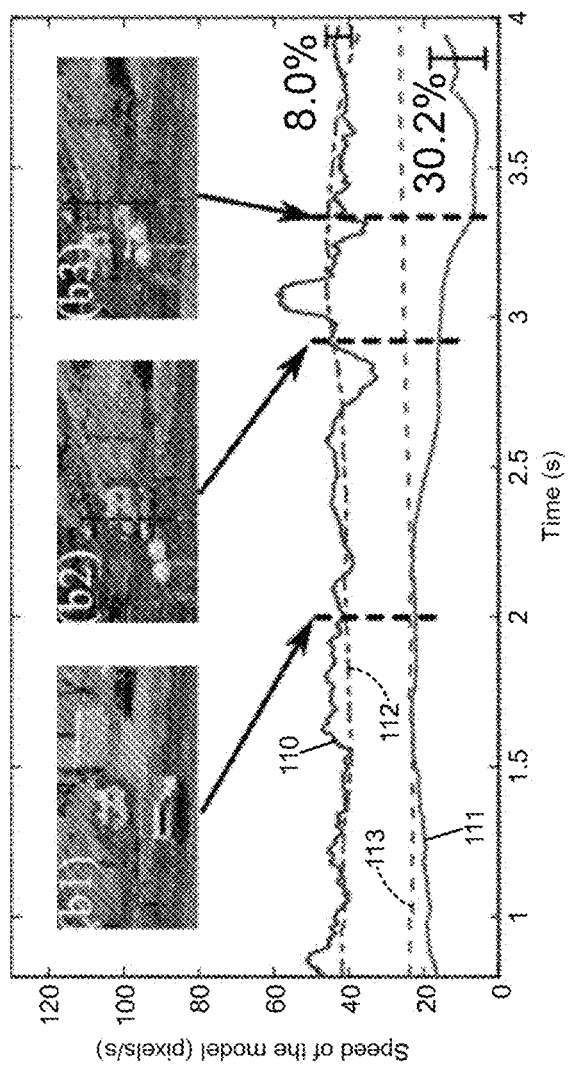
Figure 29:
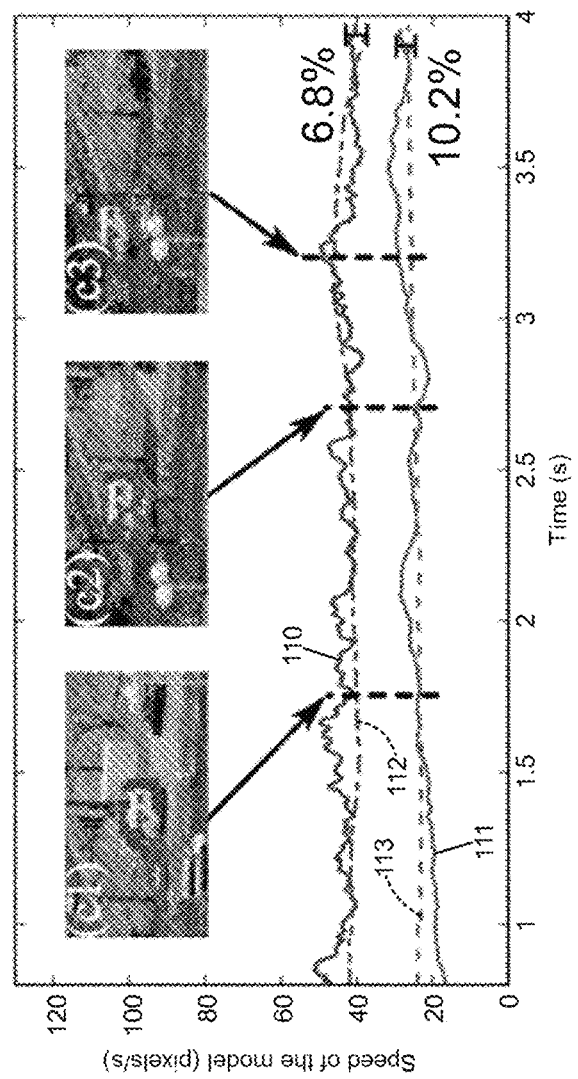
Figure 30:
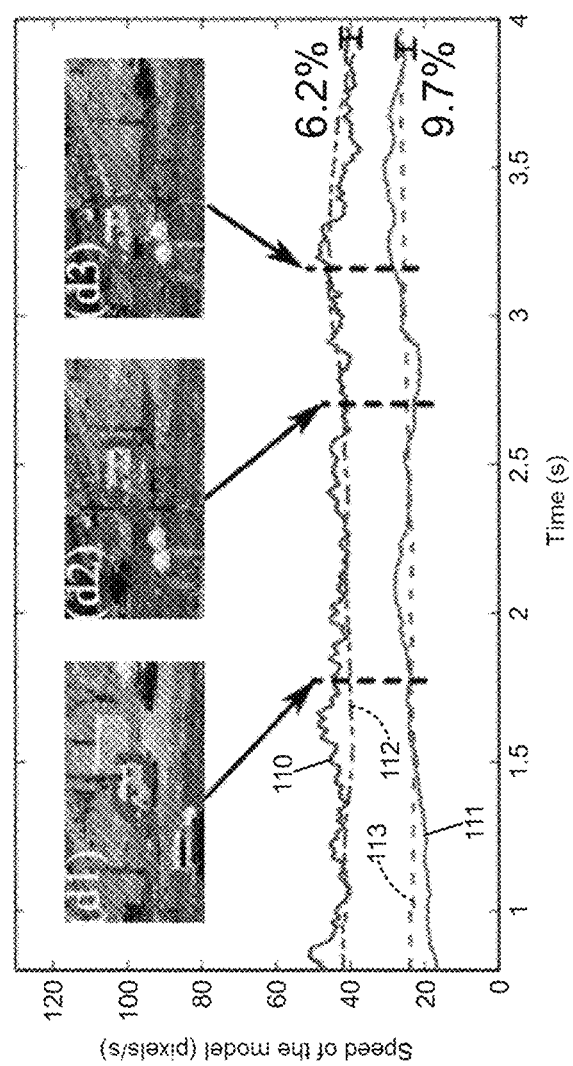
Figure 31:
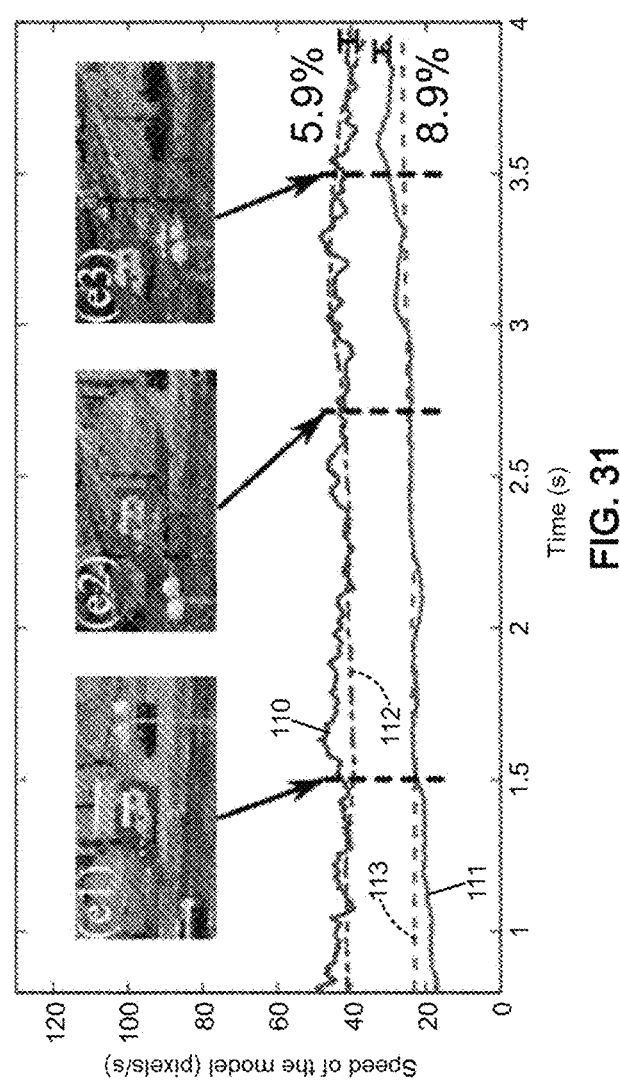
Figure 32:
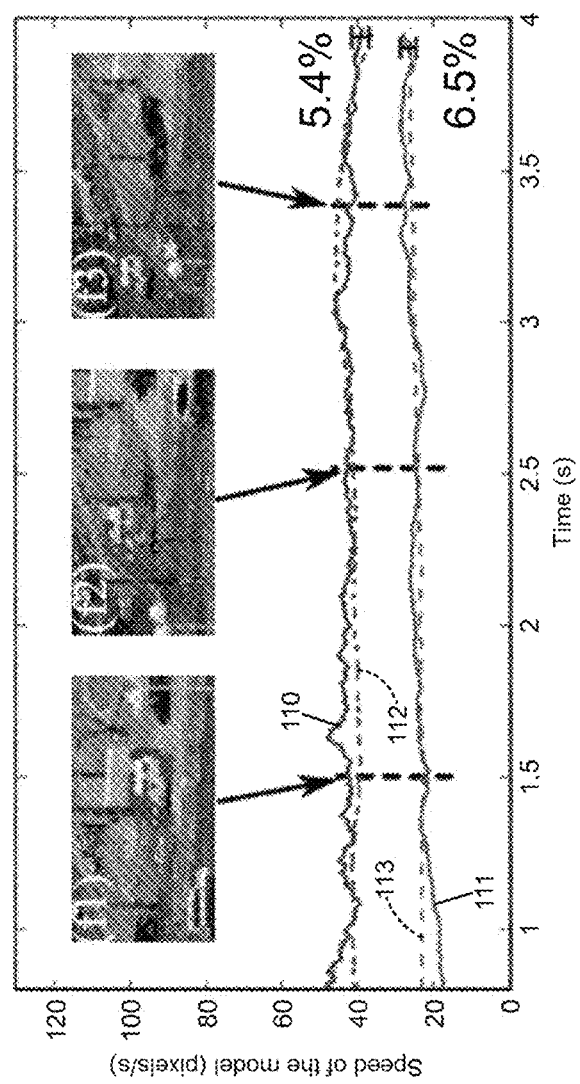

FIGS. 27-32 show the speeds of the models of the "truck" object (curve 110) and of the "car" object (curve 111) estimated during the implementation of a method according to FIG. 11, by comparing them with the actual speeds (dotted curves 112 and 113, respectively) determined manually by identifying the corresponding points on successive images. The mean speeds were respectively 42.0 pixels/s for the truck and 24.3 pixels/s for the car. The six figures correspond to six different strategies for removing ambiguity: "Attribute to closest" (FIG. 27); "Reject all" (FIG. 28); "Update all" (FIG. 29); "Weighted update" (FIG. 30); "Time constraint based on rate $r_k$" (FIG. 31); and "Combination of space and time constraints using the plane of displacement $\Pi_k$" (FIG. 32). The thumbnails included in FIGS. 27-32 show the most interesting instants for studying the differences between the methods. The beginning of each curve is the same as long as no occlusion has occurred. The percentages indicated in the right-hand portions of the graphs correspond to the mean relative deviation between the curves 110 and 112 on the one hand and between the curves 111 and 113 on the other hand.

It can be seen in FIG. 27 that the "Attribute to closest" strategy provides relatively poor results since the model of the truck is lost following its occlusion by the model of the car. The "Reject all" strategy (FIG. 28) is not more satisfactory since, this time, it is the model of the car that is lost after the occlusion.

The "Update all" strategy (FIG. 29) seems preferable since the shapes of the two vehicles remain tracked, without loss. At the end of the sequence, the events generated by the truck attract the model of the car, in such a way that the resulting trajectory for the car deviates slightly towards that of the truck and the estimated speed of the truck decreases when that of the car increases (see (c3) in FIG. 29).

The "Weighted update" strategy distributes the dynamics introduced by the ambiguous events between the various objects with weightings that depend on distances. FIG. 30 shows that the truck and the car are tracked without loss and that the speed curves correspond better to the actual speeds. There are still differences at the end of the sequence, for the same reason as in the "Update all" strategy, but with a lesser amplitude of these errors. This "Weighted update" strategy is preferred among those based on spatial constraints when multiple objects cross or collide.

The "Time constraint based on rate $r_k$" strategy (FIG. 31) gives good results in the framework of this experiment. However, the reliability of it is not ensured when the target objects have similar event rates.

Figure 33:
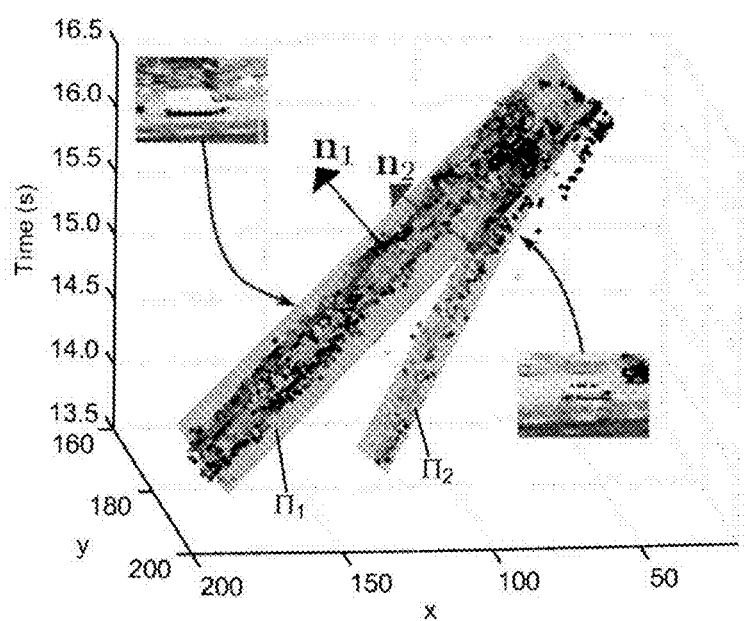
FIG. 33 is a graph that shows two planes of displacement according to FIG. 13, used to decide the attribution of events to the objects in the framework of the tracking in the results are shown in FIG. 32.

The "Combination of space and time constraints using the plane of displacement $\Pi_k$" strategy was used with a period $\Delta t$ of 3 s in order to estimate the planes of displacement $\Pi_1$ of the "truck" object and $\Pi_2$ of the "car" object (FIG. 33). As shown in FIG. 32, this strategy is that that gives rise to the lowest error in the tracking of the two vehicles. This can be explained by the fact that the local space-time planes $\Pi_1$, $\Pi_2$ substantially restrict the vicinity by eliminating incorrect attributions and by procuring better robustness to noise. It is interesting to note that the errors are distributed in a more uniform manner between the truck and the car thanks to the more reliable attribution process.

Example 5

Two sequences of an asynchronous signal generated by a mobile sensor were tested by applying the method for removing events generated by the background which was described in reference to FIG. 16.

Figure 34:
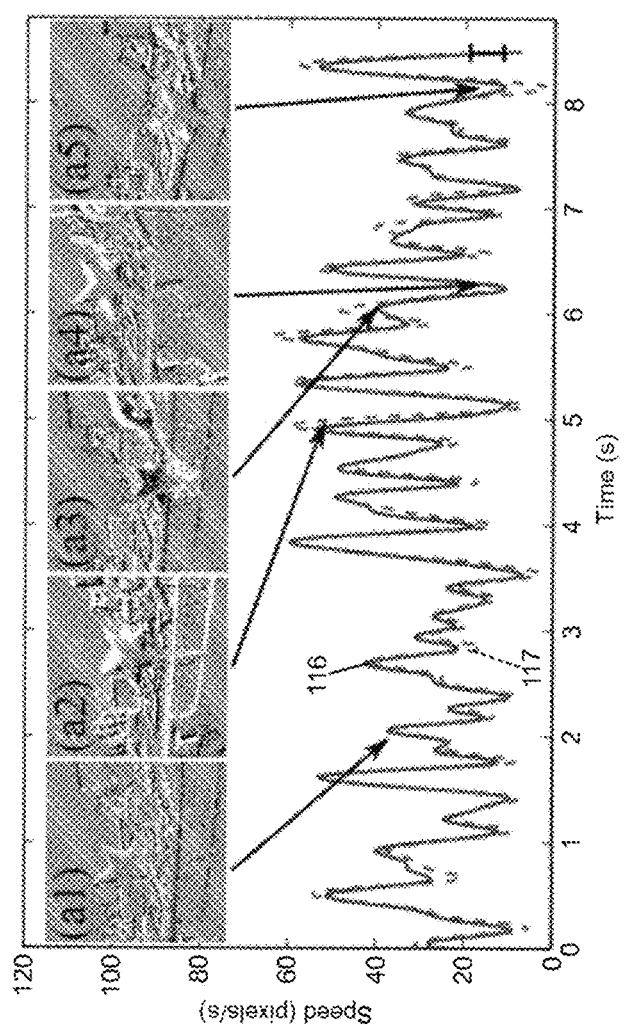
FIGS. 34 and 35 are graphs that show the model speeds obtained in two experiments of the invention wherein the asynchronous sensor itself was in motion.

In the first sequence, a star shape was displaced in an interior environment while the asynchronous sensor was held in hand and moved simultaneously. FIG. 34 shows several snapshots of the scene (a1)-(a5).

To evaluate the results, the speed of the star calculated by the method according to FIG. 11 (combining the motion of the star and that of the sensor) is shown by the curve 116 in FIG. 34, and compared to the actual speed taken manually and indicated by the dotted curve 117. The mean error between the estimated data and the actual data is estimated to be 6%. Although the scene comprises many edges in the background, the tracking process remains robust.

The second sequence comes from an exterior scene with again automobile traffic. A car shape is tracked using an asynchronous visual sensor 10 displaced manually.

Figure 35:
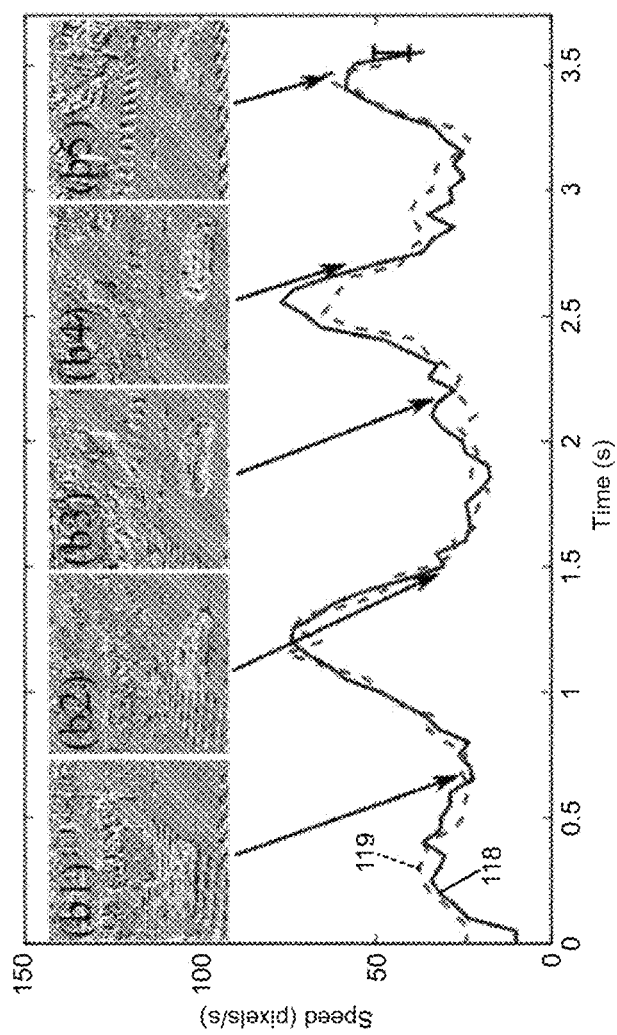

FIG. 35 shows the results of the estimations of the speed of the car (curve 118) and compares them with the actual speeds determined manually (curve 119). Despite the difficult situations to process (for example when sidewalks or pedestrian crosswalks are close to the car or are superimposed), the good time-space properties of the algorithm provide acceptable results. The mean estimation error on the speed is 15%. The quality of the tracking is degraded starting from about 3.5 seconds (b5 in FIG. 35), when the car begins to undergo substantial changes in perspective.

Globally, event-based tracking such as exposed hereinabove is robust even when the sensor and the tracked objects are in motion.

The embodiments described hereinabove are illustrations of this invention. Various modifications can be made to them without leaving the scope of the invention which stems from the annexed claims.

The invention claimed is:

1. A method of tracking a shape in a scene, comprising:
   receiving asynchronous information from a light sensor having a matrix of pixels arranged opposite the scene, wherein the asynchronous information comprises, for each pixel of the matrix, successive events originating asynchronously from said pixel; and
   updating a model comprising a set of points and representing a tracked shape of an object, after detecting events attributed to said object in the asynchronous information, wherein the updating comprises, following detection of an event:
      associating with the detected event a point of the model having a minimum distance with respect to the pixel of the matrix from which the detected event originates; and
      generating the updated model according to the pixel of the matrix from which the detected event originates and the associated point, and independently of associations made between points of the model and detected events before the detection of said event.

2. The method of claim 1, wherein when no point of the model is located at a distance less than a threshold with respect to the pixel from which a detected event originates, the model is not updated following the detection of said event which is not attributed to the object.

3. The method of claim 1, further comprising:
   estimating a plane of displacement of the object, wherein the plane of displacement is estimated in a space with three dimensions, namely two spatial dimensions corresponding to two directions of the matrix of pixels and one time dimension, by minimizing a distance criterion in relation to a set of points that mark detected events which were attributed to the object during a time window ending at a current instant; and
   following detection of an event, taking into account the estimated plane of displacement of the object in order to decide whether or not to attribute said event to the object.

4. The method of claim 3, wherein a plurality of objects have respective shapes tracked in the scene, wherein each one of the plurality of objects has a respective model updated after detection of events attributed thereto and an estimated plane of displacement, wherein the method further comprises, following detection of an event attributable to at least two of the objects:
   calculating respective distances, in the three-dimensional space, between a point marking said detected event and the planes of displacement respectively estimated for said objects; and
   attributing said detected event to the object for which the calculated distance is minimal.

5. The method of claim 3, further comprising:
   estimating a statistical distribution of distances between the plane of displacement of the object and points marking detected events which were attributed to the object; and
   following detection of an event, taking into account the estimated plane of displacement of the object and the estimated statistical distribution in order to decide whether or not to attribute said event to the object.

6. The method of claim 5, further comprising:
   determining an interval of admissible distance values based on the estimated statistical distribution; and
   not attributing a detected event to the object if the point marking said detected event in the three-dimensional space has, in relation to the estimated plane of displacement, a distance falling outside the interval of the admissible distance values.

7. The method of claim 1, wherein a plurality of objects have respective shapes tracked in the scene, wherein each of the objects has a respective model updated after detection of events attributed thereto, wherein the method further comprises, following detection of an event:
   when only one of the objects satisfies a condition of having in its model a point that has a distance less than a threshold with respect to the pixel of the matrix from which the detected event originates, attributing the detected event to said one of the objects.

8. The method of claim 1, wherein a plurality of objects have respective shapes tracked in the scene, wherein each one of the objects has a respective model updated after detection of events attributed thereto, wherein the method further comprises, following detection of an event attributable to at least two of the objects:
- for each object to which the detected event is attributable, associating with the detected event a point of the model of said object by minimizing a respective distance criterion with respect to the pixel of the matrix from which the detected event originates; and
- attributing the detected event to the object for which the minimized criterion of distance is lowest.

9. The method of claim 1, wherein a plurality of objects have respective shapes tracked in the scene, wherein each one of the plurality of objects has a respective model updated after detection of events attributed thereto, and wherein, following detection of an event attributable to at least two of the objects, the detected event is not assigned to any of said at least two of the objects.

10. The method of claim 1, wherein a plurality of objects have respective shapes tracked in the scene, wherein each one of the plurality of objects has a respective model updated after detection of events attributed to it, and wherein, following detection of an event attributable to at least two of the objects, the detected event is assigned to each one of the objects to which the detected event is attributable.

11. The method of claim 10, wherein updating the models of objects to which the detected event is attributed is carried out with weightings that depend on the distance criteria respectively minimized for said objects.

12. The method of claim 1, wherein a plurality of objects have respective shapes tracked in the scene, wherein each one of the plurality of objects has a respective model updated after detection of events attributed thereto, the method further comprising:
- for each object, estimating a rate of events attributed to said object and memorizing an instant at which the last event attributed to said object was detected; and
- following detection of an event attributable to at least two of the objects, attributing the detected event to the one of the objects for which the product of the estimated rate of events by the time interval between the memorized instant and the instant of detection of said event is closest to 1.

13. The method of claim 1, wherein determining the updated model comprises estimating a spatial transformation defined by a set of parameters, and applying the estimated spatial transformation to the model, and wherein estimating the spatial transformation comprises calculating said parameters as a function of a gradient of a distance, in the plane of the matrix of pixels, between the pixel of the matrix from which the detected event originates and a point obtained by applying the spatial transformation to the point of the model associated with the detected event.

14. The method of claim 13, wherein the spatial transformation includes a translation and a rotation in the plane of the matrix of pixels, wherein the translation has a vector $\Delta T$ taken equal to $-\eta_1 \cdot \nabla_T f(\Delta\theta_0, \Delta T_0)$ and the rotation has an angle $\Delta\theta$ taken equal to $-\eta_2 \cdot \nabla_\theta f(\Delta\theta_0, \Delta T_0)$ where $\eta_1$ and $\eta_2$ are predefined positive convergence steps and $\Delta\theta_0$ and $\Delta T_0$ are particular values of the angle of rotation and of the translation vector.

15. The method of claim 14, wherein said particular values of the angle of rotation and of the translation vector are respectively $\Delta\theta_0 = m\hat{c}p$ and $\Delta T_0 = cp - R_{\Delta\theta_0}[cm]$, where p designates the pixel of the matrix from which the detected event originates, m designates the point of the model associated with the detected event, c designates the center of the rotation, cp designates a vector pointing from c to p, cm designates a vector pointing from c to m, and $R_{\Delta\theta_0}[.]$ is the rotation of center c and of angle $\Delta\theta_0$.

16. The method of claim 14, wherein the spatial transformation is an affine transformation further including application of respective scaling factors according to two axes included in the matrix of pixels.

17. The method of claim 16, wherein the scaling factors $s_x$, $s_y$ according to the two axes x, y are respectively calculated according to $s_x = 1 + \eta_3 \cdot (|p_x| - |m_x|)$ and $s_y = 1 + \eta_3 \cdot (|p_y| - |m_y|)$ where $\eta_3$ is a predefined positive convergence step, $p_x$ and $p_y$ are respective coordinates, according to the axes x and y, of the pixel of the matrix from which the detected event originates, and $m_x$ and $m_y$ are respective coordinates, according to the axes x and y, of the point of the model associated with the detected event.

18. A shape tracking device, comprising a computer configured to:
- receive asynchronous information from a light sensor having a matrix of pixels arranged opposite a scene, wherein the asynchronous information comprises, for each pixel of the matrix, successive events originating asynchronously from said pixel; and
- update a model comprising a set of points and representing a tracked shape of an object, after detecting events attributed to said object in the asynchronous information, wherein the updating comprises, following detection of an event:
  - associating with the detected event a point of the model having a minimum distance with respect to the pixel of the matrix from which the detected event originates; and
  - generating the updated model according to the pixel of the matrix from which the detected event originates and the associated point, and independently of associations made between points of the model and detected events before the detection of said event.

* * * * *